United States Patent
Jenkins et al.

(10) Patent No.: US 11,855,991 B1
(45) Date of Patent: Dec. 26, 2023

(54) MANAGEMENT OF A SMART HOME AUTOMATION COMMUNITY

(71) Applicant: Vivint, Inc., Provo, UT (US)

(72) Inventors: Harrison Taylor Jenkins, Salt Lake City, UT (US); Jeffrey Evans, Provo, UT (US)

(73) Assignee: VIVINT, INC., Provo, UT (US)

( * ) Notice: Subject to any disclaimer, the term of this patent is extended or adjusted under 35 U.S.C. 154(b) by 127 days.

(21) Appl. No.: 17/110,189

(22) Filed: Dec. 2, 2020

(51) Int. Cl.
G06F 15/16 (2006.01)
H04L 9/40 (2022.01)
H04L 12/28 (2006.01)

(52) U.S. Cl.
CPC ........ H04L 63/102 (2013.01); H04L 12/2816 (2013.01); H04L 12/2827 (2013.01); H04L 63/08 (2013.01)

(58) Field of Classification Search
CPC ....... H04L 57/53; H04L 47/83; H04L 63/102; H04L 63/14; H04L 63/1408; H04L 63/141; G06F 9/5115
USPC ......................... 709/220, 224, 225, 226, 228
See application file for complete search history.

(56) References Cited

U.S. PATENT DOCUMENTS

| | | | | |
|---|---|---|---|---|
| 10,559,202 B2 * | 2/2020 | Yang | .................... | G06V 10/764 |
| 10,559,317 B2 * | 2/2020 | Allen | .................. | G10L 21/0208 |
| 10,607,484 B2 * | 3/2020 | Yang | ....................... | G06Q 50/26 |
| 10,719,744 B2 * | 7/2020 | Smith | .................. | G06V 10/771 |
| 10,733,865 B2 * | 8/2020 | Lundy | .................... | G08C 17/02 |
| 10,742,399 B2 * | 8/2020 | Chen | .................... | G06V 40/161 |
| 10,803,685 B2 * | 10/2020 | Marcinkowski | ...... | G06F 3/0484 |
| 10,825,273 B2 * | 11/2020 | Marcinkowski | ...... | H04L 12/283 |
| 11,145,201 B2 * | 10/2021 | Yang | ....................... | G06Q 50/26 |
| 11,189,118 B2 * | 11/2021 | Marcinkowski | ... | G07C 9/00904 |
| 2013/0226892 A1 * | 8/2013 | Ehsani | ................ | G06F 16/9538 |
| | | | | 707/706 |
| 2016/0234186 A1 | 8/2016 | Leblond et al. | | |
| 2016/0249395 A1 * | 8/2016 | Logue | ................... | H04W 76/10 |
| 2017/0336770 A1 | 11/2017 | Macmillan | | |
| 2017/0344243 A1 | 11/2017 | Fadell et al. | | |
| 2018/0062870 A1 | 3/2018 | Rovito et al. | | |
| 2018/0063150 A1 | 3/2018 | Rovito et al. | | |
| 2018/0087795 A1 * | 3/2018 | Okita | .................. | H04L 12/2816 |
| 2019/0034716 A1 * | 1/2019 | Kamarol | ............. | G06F 21/6245 |
| 2019/0043201 A1 * | 2/2019 | Strong | ................... | G06V 10/96 |
| 2019/0045107 A1 * | 2/2019 | Hennings | ............... | H04N 5/232 |
| 2019/0045207 A1 * | 2/2019 | Chen | ....................... | H04L 67/12 |

(Continued)

*Primary Examiner* — Khanh Q Dinh
(74) *Attorney, Agent, or Firm* — Kunzler Bean & Adamson

(57) ABSTRACT

Methods, systems, and devices for property manager are described. A device may transmit a request to access information from a control panel of a property associated with a smart home automation community. The request may include credentials specific to a property management personnel. In response to the transmitted request, the device may retrieve the information from the control panel of the property based in part on an authentication of the credentials. The authentication of the credentials may include receiving, from an additional device of an occupant of the property, an acknowledgement message to the request. Once the information is retrieved from the control panel, the device may generate an account associated with the control panel of the property based in part on the information, where the account grants a level of access to the property management personnel.

20 Claims, 13 Drawing Sheets

(56) References Cited

U.S. PATENT DOCUMENTS

| | | |
|---|---|---|
| 2019/0268322 A1 | 8/2019 | Leblond et al. |
| 2020/0015996 A1* | 1/2020 | Schertiger ............... A61F 5/445 |
| 2020/0213193 A1* | 7/2020 | Newell ................... H04W 4/70 |
| 2021/0225147 A1* | 7/2021 | Lundy .................... G08C 17/02 |

* cited by examiner

MANAGEMENT OF A SMART HOME AUTOMATION COMMUNITY

BACKGROUND

Home automation, or smart home technology, is being adopted by many occupants into their homes. Many residents choose to purchase and install various devices and smart technology in order to achieve a level of home automation. The smart home technology may allow a home automation system to control lighting, climate, appliances, among other functions of a home. The home automation system may also provide a home security system. However, there are a large number of individuals that are renters and may be incapable of supplying their properties with smart home technology. Therefore, facilitating and providing smart home technology by means of a property manager to renters may be desirable.

SUMMARY

The described techniques relate to improved methods, systems, devices, and apparatuses that support management of a smart home automation community.

A method of a smart home automation community, the method being performed by a computing device including at least one processor, the method including is described. The method may include transmitting a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the computing device, retrieving the information from the control panel of the property based on an authentication of the credentials, where the authentication of the credentials includes receiving, from a device of an occupant of the property, an acknowledgement message to the request, and generating an account associated with the control panel of the property based on the information, where the account grants a level of access to the property management personnel.

An apparatus for a smart home automation community. The apparatus may include a processor, memory in electronic communication with the processor, and instructions stored in the memory. The instructions may be executable by the processor to cause the apparatus to transmit a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the apparatus, retrieve the information from the control panel of the property based on an authentication of the credentials, where the authentication of the credentials includes receiving, from a device of an occupant of the property, an acknowledgement message to the request, and generate an account associated with the control panel of the property based on the information, where the account grants a level of access to the property management personnel.

Another apparatus for a smart home automation community. The apparatus may include means for transmitting a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the apparatus, retrieving the information from the control panel of the property based on an authentication of the credentials, where the authentication of the credentials includes receiving, from a device of an occupant of the property, an acknowledgement message to the request, and generating an account associated with the control panel of the property based on the information, where the account grants a level of access to the property management personnel.

A non-transitory computer-readable medium storing code for a smart home automation community at a computing device including at least one processor, the method including is described. The code may include instructions executable by a processor to transmit a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the computing device, retrieve the information from the control panel of the property based on an authentication of the credentials, where the authentication of the credentials includes receiving, from a device of an occupant of the property, an acknowledgement message to the request, and generate an account associated with the control panel of the property based on the information, where the account grants a level of access to the property management personnel.

Some examples of the method, apparatuses, and non-transitory computer-readable medium described herein may further include operations, features, means, or instructions for receiving a request for a property search including a set of parameters, where the set of parameters includes a property type, a habitable square-footage associated with the property search, a neighborhood type associated with the property search, or a combination thereof, identifying a set of vacant properties based on the request, where the quantity of vacant properties may be associated with the smart home automation community and satisfy at least one parameter from the set of parameters, and selecting a vacant property from the set of vacant properties, where the vacant property includes the property associated with the smart home automation community.

Some examples of the method, apparatuses, and non-transitory computer-readable medium described herein may further include operations, features, means, or instructions for transmitting, to the device of the occupant, a message including a selectable option to select the vacant property from the set of vacant properties, where selecting the vacant property from the set of properties include receiving, from the device of the occupant, a message including an indication of the selected vacant property from the set of vacant properties.

Some examples of the method, apparatuses, and non-transitory computer-readable medium described herein may further include operations, features, means, or instructions for generating a temporary access code for the occupant to access the property based on the indication of the selected vacant property, where the temporary access code may be valid for a temporal period and triggers the computing device to transmit a survey to the device of the occupant based on a usage of the temporary access code, and transmitting, to the device of the occupant, the temporary access code.

Some examples of the method, apparatuses, and non-transitory computer-readable medium described herein may further include operations, features, means, or instructions for transmitting, to the device of the occupant, a message including instructions to download an application associated with the smart home automation community, where the account may be accessible via the application, the message including a short message service (SMS) message including a universal resource locator (URL) directing the device to an interface to download the application.

Some examples of the method, apparatuses, and non-transitory computer-readable medium described herein may further include operations, features, means, or instructions for removing previous information from the control panel based on generating the account associated with the control panel of the property, the previous information being associated with a previous occupant of the property, and configuring the control panel to a default state based on the removing.

Some examples of the method, apparatuses, and non-transitory computer-readable medium described herein may further include operations, features, means, or instructions for configuring one or more home automation components to a default state based on configuring the control panel to the default state, where the one or more home automation components includes a stand-alone camera, a smart thermostat, a smart appliance, a smart lighting system, or a heating ventilation air control (HVAC) system, or a combination thereof, where the previous information includes a setting history associated with the one or more home automation components.

Some examples of the method, apparatuses, and non-transitory computer-readable medium described herein may further include operations, features, means, or instructions for adding the control panel of the property to the smart home automation community based on the retrieving, where generating the account associated with the control panel of the property may be further based on adding the control panel of the property to the smart home automation community.

Some examples of the method, apparatuses, and non-transitory computer-readable medium described herein may further include operations, features, means, or instructions for configuring a set of parameters associated with the account of the property based on the information, where configuring the account grants the level of access to the property management personnel, and storing the information of the property in a relational database associated with the smart home automation community.

In some examples of the method, apparatuses, and non-transitory computer-readable medium described herein, the level of access includes assigning a capability for the property management personnel to unlock or lock one or more barriers associated with the property based on an emergency occasion; and the level of access includes assigning a restriction on the account for the property management personnel, the restriction being an inability for the property management personnel to access the control panel or one or more home automation components associated with the property.

In some examples of the method, apparatuses, and non-transitory computer-readable medium described herein, configuring the set of parameters further may include operations, features, means, or instructions for configuring the control panel to periodically or aperiodically receive or retrieve activity from one or more home automation components associated with the property, configuring the control panel to generate a report based on the activity, the activity including a sensor activation or deactivation from one or more home automation components, a battery status associated with the one or more home automation components, where the reporting further includes occurrences of service personnel visiting the property, occurrences of the property management personnel accessing or altering a feature on the account, or both, and uploading the report to the account, where the report may be viewable to the occupant and the property management personnel.

Some examples of the method, apparatuses, and non-transitory computer-readable medium described herein may further include operations, features, means, or instructions for granting an administrative management personnel access to the account, the access being less than or equal to the level of access granted to the property management personnel, where the level of access may be further based on the granting.

Some examples of the method, apparatuses, and non-transitory computer-readable medium described herein may further include operations, features, means, or instructions for receiving, from the control panel or the device of the occupant, a service request, identifying a schedule associated with the occupant based on the service request, where the service request provides an indication to plan a service with or without the occupant being present at the property, and automatically scheduling a service personnel to visit the property and perform the service based on the service request and the schedule associated with the occupant.

Some examples of the method, apparatuses, and non-transitory computer-readable medium described herein may further include operations, features, means, or instructions for transmitting, to a device of the service personnel, a message indicating the service request, where the message includes at least one of payment information, geolocation information of the property, access information of the property, contact information of the occupant or the management personnel, or any combination thereof.

Some examples of the method, apparatuses, and non-transitory computer-readable medium described herein may further include operations, features, means, or instructions for transmitting, to a device of the service personnel, access information to the property at a temporal period associated with the scheduled service, where the access information includes a digital identification number associated with a digital lock of a barrier to the property.

Some examples of the method, apparatuses, and non-transitory computer-readable medium described herein may further include operations, features, means, or instructions for configuring the control panel to transmit a notification message to the device of the occupant or display the notification message at the control panel, where the notification message includes an indication of the service performed, an entry time of the service personnel to the property, or an exit time of the service personnel out of the property, or a combination thereof.

In some examples of the method, apparatuses, and non-transitory computer-readable medium described herein, the control panel is associated with a subscription service provider.

DETAILED DESCRIPTION

The following relates to a property management system providing and controlling a smart home service for a property. The term "property" may be used herein to describe a property that may be either residential, commercial, or industrial. The property management system may allow a degree of access and control to an administrator (e.g., a property manager) to effectively facilitate the smart home service to occupants of their property. A smart home service may provide occupants (e.g., renters) with various smart home features and smart automation devices, such as a smart lighting system, a smart thermostat, and the like. In some implementations, the property management system may support a platform/portal for controlling multiple property units based on an occupancy status. For example, the platform may provide different levels of access and control, to the administrator, for an occupied property compared to an unoccupied property. The property management system may further provide the platform/portal for both the administrator of a property as well as occupants of the property. For example, the property management system may include an application (e.g., a phone application, web application) that may allow administrators and occupants to interact with the smart home service. Thereby, the property management system may provide occupants with the benefits of home automation and administrators (e.g., property managers) with various tools and capabilities necessary to manage a property.

Aspects of the disclosure are initially described in the context of a system. Aspects of the disclosure are further illustrated by and described with reference to apparatus diagrams, system diagrams, and flowcharts that relate to management of a smart home automation community.

Figure 1:
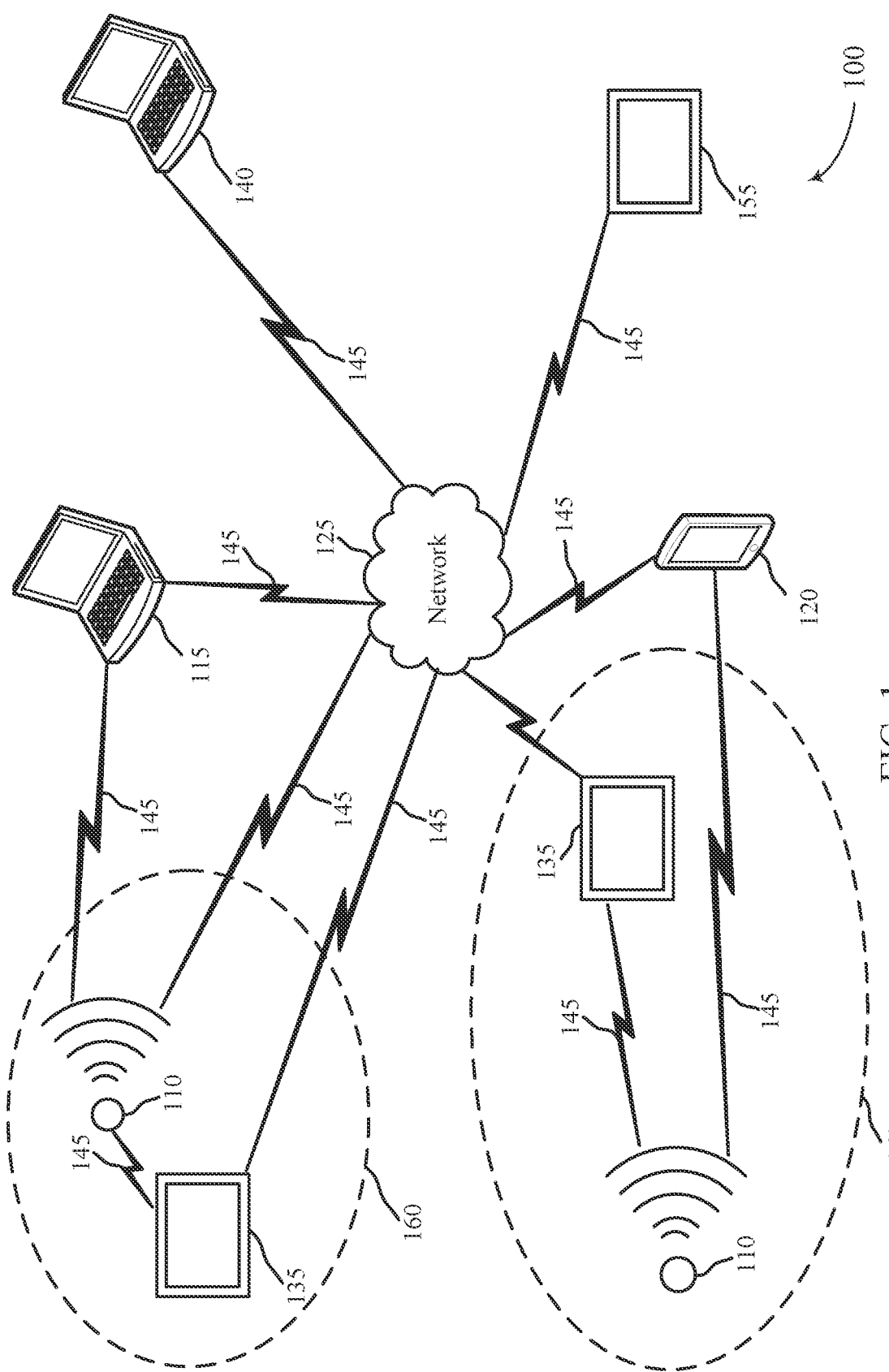
FIG. 1 illustrates an example of a system for property manager that supports management of a smart home automation community in accordance with aspects of the present disclosure.

FIG. 1 illustrates an example of a system for property manager that supports management of a smart home automation community in accordance with aspects of the present disclosure. The system 100 may include one or more sensor units 110, local computing devices 115 and 120, residences 160, network 125, control panel 135, and remote computing device 140, among other components. One or more sensor units 110 may communicate via wired or wireless communication links 145 with one or more of the local computing devices 115 and 120, or network 125. The network 125 may communicate via wired or wireless communication links 145 with the control panels 135, the management interface 155, and the remote computing device 140. In alternate examples, the network 125 may be integrated with any one of the local computing devices 115 and 120, or remote computing device 140, such that separate components are not required.

The residences 160 (e.g., a property unit) may have a smart home service to provide occupants with various smart home features and smart automation devices, such as a smart lighting system, a smart thermostat, and the like. The smart home service of each residence 160 may use a network of devices (e.g., a control panel 135, one or more sensor units 110, local computing devices 115 and 120) to manage the smart home service. As used herein, the term "residence" or "property unit" may be used to describe a property that may be either residential, commercial, or industrial.

A property manager may manage, via a property management system, a smart home service of one or more residences 160. The property management system may allow a degree of access and control to an administrator (e.g., a property manager) to effectively facilitate the smart home service to occupants of the residences 160. In some implementations, the property management system may support a platform/portal for controlling multiple residences 160 based on an occupancy status. For example, the platform may provide different levels of access and control, to the administrator, for an occupied residence 160 compared to an unoccupied residence 160. The property management system may further provide the platform/portal for both the administrator of a residence 160 as well as occupants of the residence 160. For example, the property management system may include a management interface 155 (e.g., a phone application, web application) that may allow an administrator to interact with the smart home service. In another example, the property management system may include an interface (e.g., available at a local computing device 115 and/or 120) that may allow occupants to interact with the smart home service remotely (e.g., without using a control panel 135 directly). Thereby, the property management system may provide occupants with the benefits of home automation and administrators (e.g., property managers) with various tools and capabilities necessary to manage a property.

Local computing devices 115 and 120 and remote computing device 140 may be custom computing entities configured to interact with sensor units 110 via network 125 and/or control panel 135. In other examples, computing devices 115 and 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a smart watch, a fitness tracker, a mobile phone, a personal digital assistant (PDA), and/or any other suitable device operable to send and receive signals, store and retrieve data, and/or execute modules. In some examples, local computing devices 115 and 120 and/or remote computing device 140 may comprise or be coupled to internal and/or external sensors which are enabled to sense and capture data similar to or in the same manner as sensors 110. In some cases, the local computing devices 115 and 120 may be a control panel 135.

The local computing devices 115 and 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some examples, the local computing devices 115 and 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115 and 120 may be operable to control operation of the output of the local computing devices 115 and 120. The output may be a television, a liquid crystal display (LCD) monitor, a cathode ray tube (CRT) monitor, speaker, tactile output device, and/or the like. In some examples, the output may be an integral component of the local computing devices 115 and 120. Similarly stated, the output may be directly coupled to the processor. For example, the output may be the integral display of a tablet and/or smart phone. In some examples, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115 and 120 to the output.

The remote computing device 140 may be a computing entity operable to enable a remote user to monitor the output of the sensor units 110, the interface of control panels 135, or the management interface 155. The remote computing device 140 may be functionally and/or structurally similar to the local computing devices 115 and 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145. In some cases, the remote computing device 140 may include a web interface for the control panels 135 or the management interface 155. For example, a user may access the functions of local computing devices 115 and/or 120, sensor units 110, control panels 135, and/or management interface 155 from remote computing device 140. For example, in some examples, remote computing device 140 may include a mobile application that interfaces with one or more functions of computing devices 115 and/or 120.

In some examples, local computing devices 115 and 120 may communicate with remote computing device 140 or control panel 135 via network 125. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some examples, remote computing device 140 may associated with an occupant of a residence 160 or a user associated with a management of the residence 160. The remote computing device 140 may be a personal computer (e.g., desktop and/or laptop), control panel, smart phone or smart watch, and/or tablet.

In some examples, the sensors units 110 may be configured to conduct periodic, continuous, conditional, or otherwise ongoing automatic measurements related to determining the occurrence of an event or a condition within or around a residence 160. In some cases, the sensor units 110 may correspond to smart home devices. Sensor units 110 may include or relate to, but are not limited to: temperatures, humidity, sound level, smoke, structural features (e.g., glass breaking, door opening and/or closing, window opening and/or closing, window position, door position), time, geolocation data of a user and/or a device, light, darkness, weather, time, system performance, the status and/or the usage of an electronic device and/or a building feature, and/or other inputs that relate to a security and/or an automation system and/or an occupant of an area and/or a structure, such as a home. Each sensor unit 110 may be capable of sensing one or more environmental parameters, or alternatively, separate sensor units 110 may monitor separate environmental parameters. For example, one sensor unit 110 may measure ambient light level, while another sensor unit 110 (or, in some examples, the same sensor unit 110) may detect a locking status of an entrance of the residence 160. In another example, the sensor unit 110 may be a camera for capturing an activity feed within the residence 160.

Control panel 135 may be a smart home system panel, for example, an interactive panel permanently or removably mounted on a wall in a user's residence 160. Control panel 135 may be in direct communication via wired or wireless communication links 145 with the one or more sensor units 110, or may receive sensor data from the one or more sensor units 110 via local computing devices 115 and 120 and network 125, or may receive data via remote computing device 140, and network 125. Data gathered by the one or more sensor units 110 within a residence 160 may be received by the residence's control panel 135. Additionally or alternatively, the data from the sensor units 110 may be gathered by local computing devices 115 and 120. Here, the local computing devices 115 and 120 may be a thermostat, other wall-mounted input/output smart home display, a personal computer, or portable electronic device such as a smart phone, tablet, and/or smartwatch. The control panel 135 may process the data received from the one or more sensor units 110 to determine whether to store and/or share (e.g., with other networked devices or a third-party source) the data, alert a user, take an action in response to obtaining the data, or send the data to the management interface 155. In alternate examples, local computing devices 115 and/or 120 or remote computing device 140 may process the data received from the one or more sensor units 110, via network 125. Data transmission may occur via, for example, frequencies appropriate for a personal area network (such as BLUETOOTH® or IR communications) or local or wide area network frequencies such as, but not limited to, radio frequencies specified by the IEEE 802.15.4 standard.

The control panel 135 may further control aspects of the conditions within the residence 160. In some cases, the control panel 135 may control conditions within the residence 160 using the sensors 110. For example, a sensor unit 110 may detect a temperature within the residence 160 while the same sensor unit 110 or a distinct sensor unit 110 may control the temperature within the residence 160 based on information received from the control panel 135. In another example, a sensor unit 110 may detect a locked status of the residence 160 (e.g., whether a window, door, etc. is locked or unlocked) while the same sensor unit 110 or a different sensor unit 110 may control the locked status of the residence 160 based on information received from the control panel 135. In some other cases, the local computing devices 115 and/or 120 may be located within the residence 160. The local computing devices 115 and/or 120 may control the aspects of the conditions within the residence 160. For example, one of the local computing device 115 or 120 may control the temperature, lights, camera, and/or locked status of the residence 160. Additionally or alternatively, the management interface 155 may communicate, via the network 125, with the control panel 135 and/or the sensor units 110 to control/report aspects of the conditions within the residence 160.

The techniques described herein may provide improvements in property management system, and more specifically to computing devices handling processes related to property management. For example, the techniques described herein may provide benefits and enhancements to the operation of the devices 115, 125, 135, 140, and 155. By supporting efficient and effective techniques for property management, the operational characteristics, such as power consumption, processor utilization (e.g., CPU processing utilization), and memory usage of the devices 115, 125, 135, 140, and 155 may be reduced. The techniques described herein may also provide efficiency to the devices 115, 125, 135, 140, and 155 by reducing latency associated with processes related to the property management.

Figure 2:
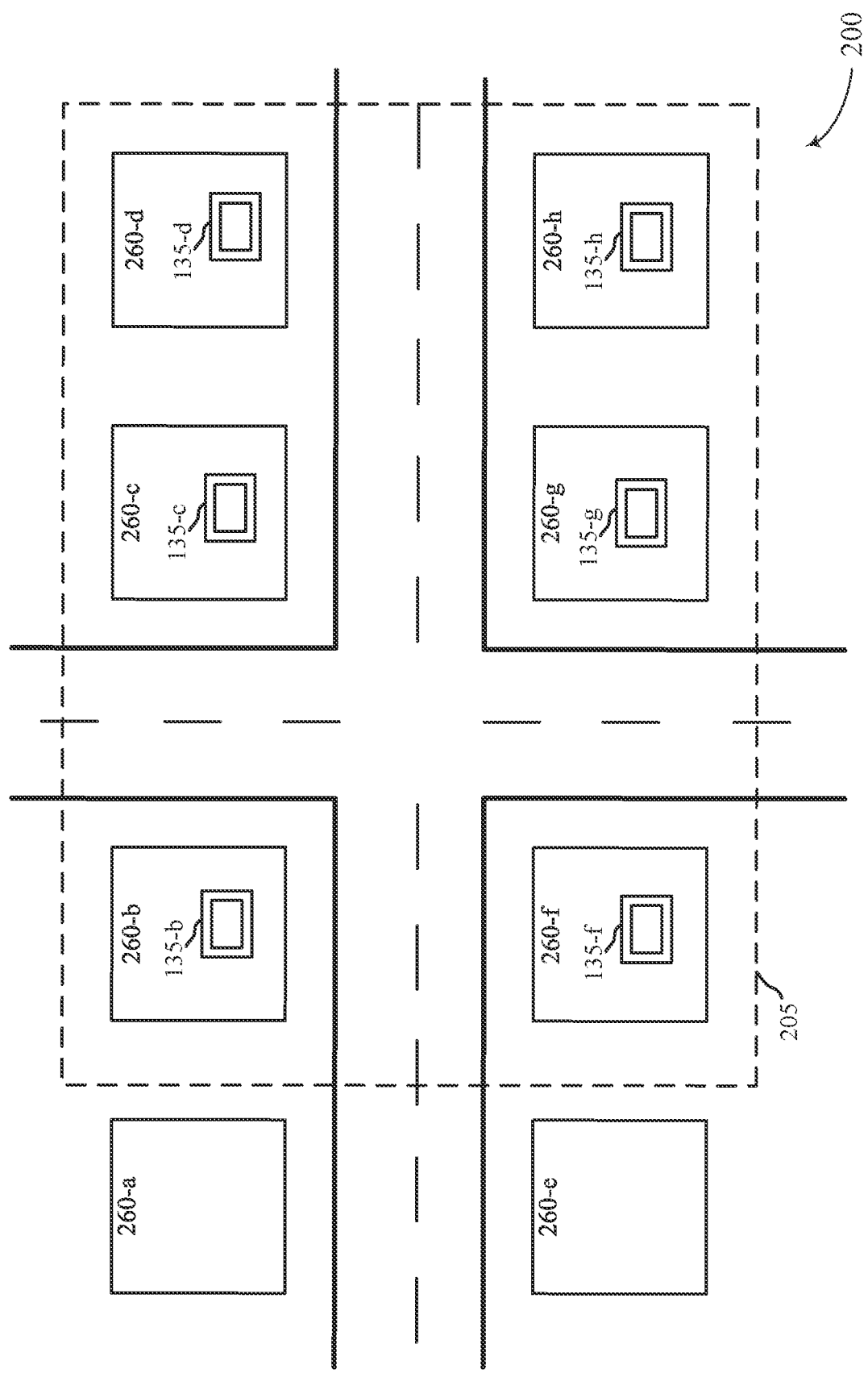
FIG. 2 illustrates an example of a block diagram relating to a property management system that supports management of a smart home automation community in accordance with aspects of the present disclosure.

FIG. 2 illustrates an example of a block diagram 200 relating to a property management system that supports management of a smart home automation community in accordance with aspects of the present disclosure. FIG. 2 shows an example residential neighborhood having eight residences 260 (e.g., residence 260-*a*, residence 260-*b*, residence 260-*c*, residence 260-*d*, residence 260-*e*, residence 260-*f*, residence 260-*g*, and residence 260-*h*). Although FIG. 2 shows an example residential neighborhood with residences located within a geographic area of one another, it should be understood that neighborhood may be a residential area, a commercial area, a rural area, and/or a mixed use area. In addition, residences 260 may be any type of structures (e.g., apartments, condos, town homes), and the structures need not be located next to one another, but rather may be located in different geographic locations separated by any contemplated distance (e.g., same sub-division, same commercial block, same multi-unit building, different sub-divisions, different commercial blocks, located on the same street but separated by one or miles). The systems and methods described herein relate to the example residential neighborhood, but the system and methods are not limited to this neighborhood configuration.

In the neighborhood of FIG. 2, any of the eight residences 260 may employ smart home features and may include a control panel 135 (e.g., control 135-*a* through 135-*h*) to control/report various aspects of the condition of the corresponding residence 260. In some examples, some residences 260 may not employ smart home features and may be absent of a control panel. However, not all of the residences 260 may be controlled by a single property management system. In some cases, the dotted line 205 may denote a community, which corresponds to a group of residences 260 that may be rental properties managed by a single property management system. In some cases, the residences 260 may be grouped into a community 205 based on one or more features. For example, the residences 260 may be grouped into a community 205 based on proximity (e.g., each of the residences 260 is within a certain radius), type of property (e.g., each of the residences 260 is an apartment building), or owner (e.g., each of the residences 260 is owned by a same owner).

In some cases, a management interface (e.g., management interface 155) may provide an administrator (e.g., a property manager, an employee of a property management company) a platform to manage each of the one or more residences 260 within the community in a collective manner. An administrator may only have management capabilities for a subset of the residences 260 that are managed at the management interface. The subset may correspond to the residences that are relevant to the administrator. For example, the management interface may be used to manage more than one community 205. However, an administrator may only be employed to manage a single community 205. Here, the only residences 260 that are relevant for the administrator may be the residences 260 within that certain community 205. In another example, an administrator may be a property owner owning residences 260 across more than one community 205. Here, there may be residences 260 from two or more communities 205 that are relevant to the administrator.

The management interface may enable an administrator to control aspects of one or more of the residences 260 (e.g., via control panels 135). That is, the residences 260 may be equipped with a security and/or automation system (e.g., as described with reference to FIG. 1). The management interface may communicate with sensors and/or devices within the security and/or automation system of each residence and provide a platform for an administrator to manage the residences 260. In some cases, the management interface may allow administrators to control aspects of residences 260 according to community-wide management. For example, the management interface may allow an administrator to fix some global settings across all the residences 260 within the community 205. The settings may relate to, for example, smart thermostat thresholds. In another example, the management interface may report anomalies detected by a security and/or automation system within a residence (e.g., an active alarm, a detected flood) to one or more administrators.

Figure 3:
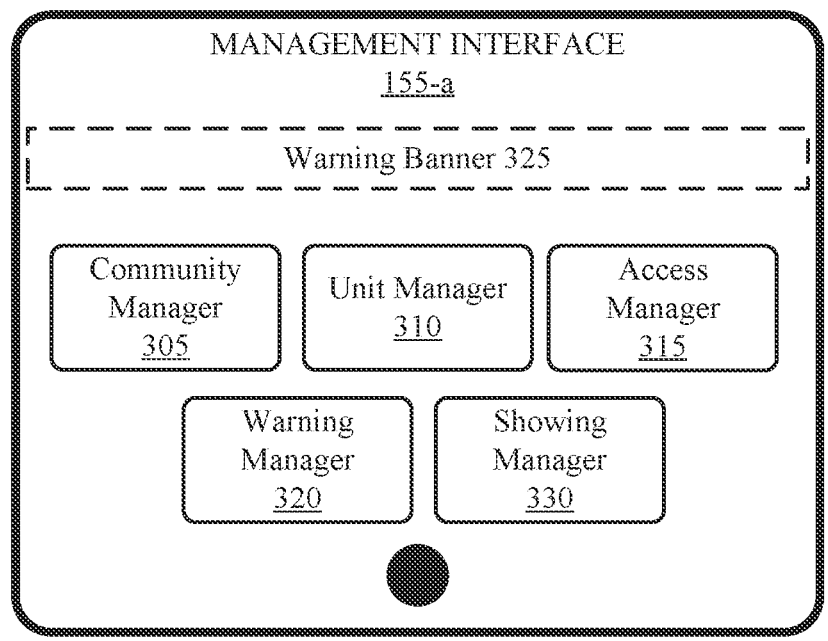
FIG. 3 illustrates an example of an interface that supports management of a smart home automation community in accordance with aspects of the present disclosure.

FIG. 3 illustrates an example of an interface 300 that supports management of a smart home automation community in accordance with aspects of the present disclosure. The interface 300 may show a management interface 155-*a*. Management interface 155-*a* may be an example of management interface 155 as discussed with reference to FIG. 1. In some cases, the management interface 155-*a* may include a community manager 305, unit manager 310, access manager 315, warning manager 320, and showing manager 330. The management interface 155-*a* may provide an administrator (e.g., a property manager, an employee of a property management company, an owner of one or more residences) a platform for managing smart home services at one or more residences (e.g., rental properties). The management interface 155-*a* may provide an administrator (e.g., a property manager, an employee of a property management company, an owner of one or more residences) a platform for managing smart home services at one or more residences (e.g., rental properties).

An administrator may have access to the management interface 155-*a* via a web interface. For example, the administrator may access the management interface 155-*a* using a remote computing device (e.g., computing device 140) or a local computing device (e.g., computing device 115, 120) and accessing the web interface. In some cases, the web interface may include a verification process prior to granting the administrator access to the management interface 155-*a*. For example, each administrator may have a password that, when entered correctly at the web interface, grants the administrator access to the management interface 155-*a*.

The community manager 305 may provide an administrator a platform for creating and/or managing a community of residences (e.g., a community 205 comprising residences 260 as discussed with reference to FIG. 2). In some cases, the community manager 305 may contain differing amounts of functionality depending on the type of administrator. For example, an employee of a specific community may only have access to the management functionality for that specific community via the community manager 305. In another example, an administrator of the specific community may have access to the creation and management functionalities for the specific community via the community manager 305. In a third example, a property manager or owner for properties within multiple communities may have access to creating, removing, and managing the multiple communities via the community manager 305.

While the community manager 305 may offer administrators management functionality as it relates to a group of residences, the unit manager 310 may offer management functionality for individual residences. For example, the unit manager 310 may allow administrators to control certain functionalities within a residence (e.g., lights, locks, temperature). In some cases, the controllable functionalities may be based on the type of administrator (e.g., community employee, property owner) and/or the status of the residence (e.g., vacant, occupied). Further, the unit manager 310 may enable an administrator to facilitate resident move-ins and move-outs. For example, a security and/or automation system of a residence may be customizable by a resident (e.g., via an in-residence control panel). The unit manager 310 may provide a platform to register a new resident (e.g., during a move-in) so that the resident has access to the security and/or automation system within their own residence. Additionally or alternatively, the unit manager 310 may manage the extent of control of a residence an administrator may have (e.g., via the unit manager 310) based on the occupancy status of the residence.

The access manager 315 may provide the administrator with a platform to grant or monitor access to one or more residences. An administrator may select the access manager 315 to navigate to a screen for enabling or disabling access at a relevant residence. For example, in the event that maintenance workers need access to the apartments on a certain floor of a building, the access manager 315 may provide a platform for an administrator to enable the access for the maintenance workers as well as communicate the access to the affected residents. In another example, a resident may request for access to their unit to be extended to additional people during a certain time. The access manager 315 may facilitate resident-requested access.

The warning manager 320 may communicate information related to anomalies detected at one or more residences. That is, the warning manager 320 may detect an anomaly at a residence and generate an automated report based on the type of anomaly occurring. An anomaly may include a flood, an in-progress alarm, extreme temperatures detected at the residence, an offline device (e.g., a device for the security and/or automation system), an in-residence panel malfunction, a broken sensor (e.g., for the security and/or automation system), an abnormal humidity level, a resident system with more than 10 users, or a heating, ventilation, and air conditioning (HVAC) system short cycling. The report may communicate to one or more administrators the detection of the anomaly. In some cases, the warning manager 320 may generate a warning banner 325 to communicate any urgent warning information as well as sending a text and email notification to any relevant administrators (e.g., property manager, property owner, community employee(s)). The warning banner 325 may act as a global warning banner 325 that is visible on all display screens of the management interface 155-*a*. In some cases, the warning banner 325 may report more urgent anomalies than those anomalies that are reported via other avenues. For example, the warning manager 320 may generate the warning banner 325 if the security and/or automation system within a residence indicates a flood, an alarm in progress, or that the temperature of the residence has deviated from a certain range (i.e. falls below 55 or above 90 degrees Fahrenheit).

The warning manager 320 may report detected anomalies in additional or alternative ways. In some cases, an administrator may view detected anomalies by selecting the warning manager 320. For example, an administrator may select the warning manager 320 to view warnings related to the residences within the community while a property owner may select the warning manager 320 to view warnings related to each of the owned residences (which may include residences from more than one community). Once an administrator selects the warning manager 320, the warning manager may display warnings (e.g., anomalies) related to all relevant residences. Additionally or alternatively, the warning manager 320 may distribute a periodic email summary to each administrator relating to relevant detected anomalies (e.g., anomalies detected at the residences that are relevant to the administrator). In some cases, a localized notification (e.g., a text and/or email) regarding a detected anomaly may be sent to the relevant administrators (e.g., in addition to being displayed at the management interface 155-*a* and/or being contained within a periodic email summary). In some cases, the warning manager 320 may further generate an anomaly notification on an in-unit control panel. This may occur in response to a low battery within the property management system, in the event that the property management system for the residence has been set to an unexpected mode (i.e. maintenance mode), or if the in-residence control panel has been disconnected.

The management interface 155-*a* may have a showing manager 330 to allow administrators to schedule, facilitate, and/or analyze showings for one or more residences. That is, if a residence is (or is predicted to be by a certain date in the future) vacant, the showing manager 330 may provide an administrator with a platform to schedule and manage showings of the residence. The showing manager 330 may manage an externally available web page (e.g., viewable by prospective residents) including an indication and timeline of residences that are available for rent. The showing manager 330 may provide a platform for prospective residents to easily set up and tour potential residences. The showing manager 330 may also allow an administrator to grant potential residents access to residences for unattended showings. The showing manager 330 may, for example, grant temporary access to potential residents, while locking the residence when there are no showings (e.g., at night). The showing manager 330 may notify an administrator (e.g., property manager) in the event that an unattended tour of a residence is exceeding a certain time. For example, the showing manager 330 may notify the administrator when unattended tours exceed 30 minutes. The showing manager 330 may additionally provide information regarding the tours to the administrator. For example, the showing manager 330 may provide information regarding how long, on average, prospective residents spend touring a residence and at what times tours are most common. In some cases, the showing manager 330 may automatically issue a survey to the prospective residents regarding the unattended tour (e.g., via an email).

Figure 4A:
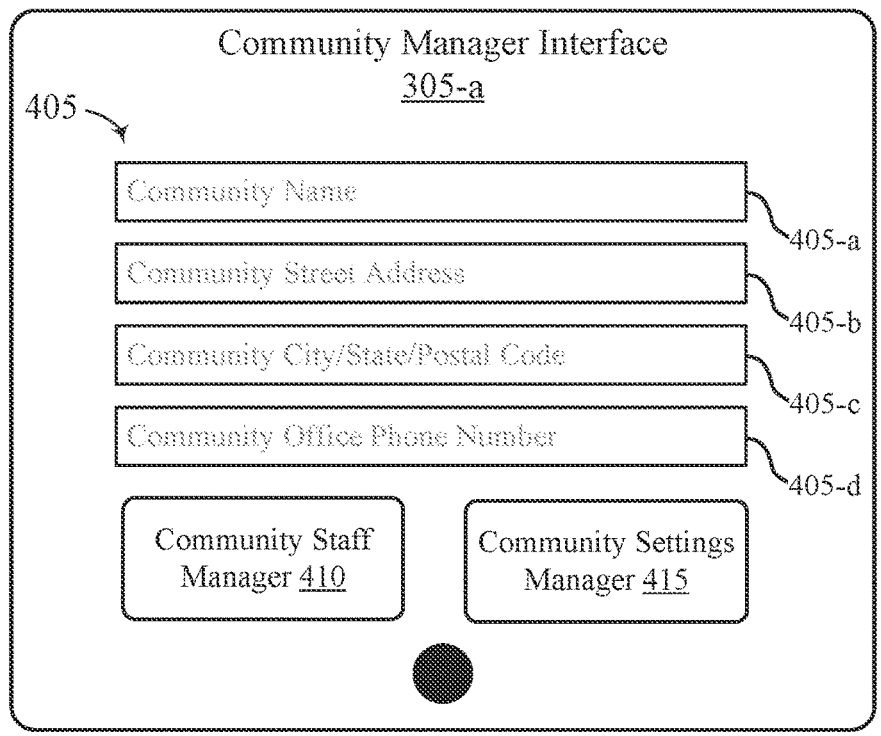
FIGS. 4A and 4B illustrate examples of an interface that supports management of a smart home automation community in accordance with aspects of the present disclosure.

FIG. 4A illustrates an example of an interface 400-*a* that supports management of a smart home automation community in accordance with aspects of the present disclosure. The interface 400-*a* may show a community manager interface 305-*a*. The community manager interface 305-*a* may be an example of a display shown after an administrator selects the community manager 305 at the management interface 155-*a* as discussed with reference to FIG. 3. In some cases, the community manager interface 305-*a* may include community information 405, a community staff manager 410, and/or a community settings manager 415. In some cases, the community manager interface 305-*a* may display a subset of the community information 405, the community staff manager 410, and the community settings manager 415. For example, the community manager interface 305-*a* may display only the community information 405 and the community settings manager 415 for a community employee. Alternatively, the community manager interface 305-*a* may display all three of the community information 405, community staff manager 410, and the community settings manger 415 for a community administrator.

The community information 405 may include the community name 405-*a*, the community street address 405-*b*, the community city, state, and/or postal code 405-*c*, and/or the community office phone number 405-*d*. In some cases, the community manager interface 305-*a* may support and provide a community creation feature. For example, an administrator (e.g., a property manager, a property management system account manager) may create a community of residences. For example, multiple residences that are within a close proximity may constitute a community (e.g., as described with reference to FIG. 2). For example, multiple residences within a predefined distance may a community. The administrator may enter the community information 405 into the community manager interface 305-*a* in order to create the community.

Upon creation of the community, the community manager 305 may automatically populate the individual residence unit numbers and address data at that time. In some cases, the community street address 405-*b* may not match the individual residence addresses. However, in some other cases the community manager 305 may be configured such that all the residences within a community have the same street address (although the physical locations may be different) with distinguishing residence unit numbers. That is, differences between buildings within a same community may be implied by differences in the addresses or residence unit number for all the individual residence units in the community (e.g. different street addresses for the building or a different prefix on the residence unit number of an apartment).

In some implementations, when a community is created at the community manager interface 305-*a*, the community manager 305 may automatically register smart home devices from each residence. The community manager 305 may register the smart home device name and associated device identifier. The registration information may be configured as a device template. The community manager 305 may also indicate whether each residence within the community is monitored or non-monitored when the community is created.

The community staff manager 410 may manage administrators. For example, the community manager 305 may support multiple community administrators and/or community team members (community employee) for different communities. The community staff manager 410 may manage the access of the different administrators according to their relevant residences. For example, the community staff manager 410 may ensure that community-specific employees only have access to the residences within the specific community. Additionally, the community staff manager 410 may ensure that an administrator with relevant residences across communities (e.g., a property manager, a property owner) may have access to the residences across the relevant communities. In some cases, the community staff manager 410 may provide a platform for certain administrators (e.g., property managers, property owners, community administrators) too add or delete other administrators.

The community settings manager 415 may manage certain settings (e.g., of the security and/or automation systems) at one or more residences within the community. The community settings manager 415 may provide administrators with the ability to set global settings for a community. That is, the community settings manager 415 may apply these global settings across all the residences within the community. The settings may be communicated, by a computing device (e.g., computing device 140 as described with reference to FIG. 1), to a control panel (e.g., control panel 135 as described with reference to FIG. 1) of each residence within the community. The control panel may enact the global settings by controlling and/or communicating the settings to devices associated with the residence (e.g., one or more sensor units, local computing devices, etc.). The settings may relate to, for example, smart thermostat thresholds. In some cases, the community settings manager 415 may not allow occupants to set their smart thermostats above or below certain thresholds. In other cases, the community settings manager 415 may allow occupants to set their smart thermostats to any temperature but may notify the relevant administrators if the thresholds are surpassed.

The community settings manager 415 may allow administrators to send a message to an entire community. In some cases, an administrator may send a message across multiple communities. The message may be sent to the control panel located within each residence, or property management system application (e.g., a web-based interface at a local computing device) to be viewed by each occupant.

Figure 4B:
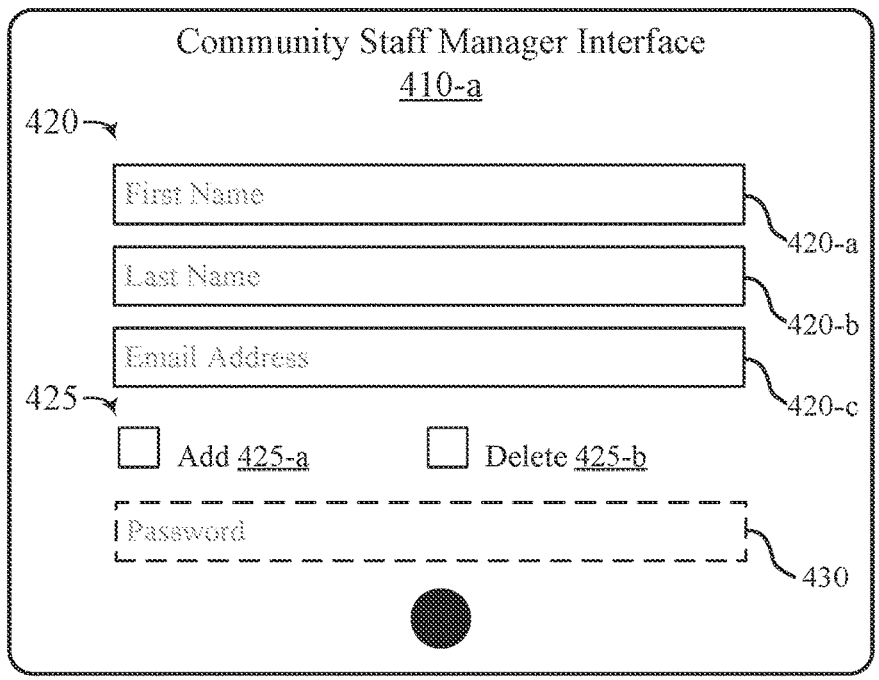

FIG. 4B illustrates an example of an interface 400-*b* that supports management of a smart home automation community in accordance with aspects of the present disclosure. The interface 400-*b* may show a community staff manager interface 410-*a*. The community staff manager interface 410-*a* may be displayed when an administrator selects the community staff manager 410 as discussed with reference to FIG. 4A. In some cases, only certain types of administrators may have access to the community staff manager interface 410-*a*. For example, community administrators, property managers, and/or property owners may have access to the community staff manager interface 410-*a*. In some cases, access may be determined by the login information entered by the administrator when accessing the management interface 155 (e.g., as discussed with reference to FIG. 3). The community staff manager interface 410-*a* may include community staff information 420, a community staff option 425, and a password 430.

The community staff manager interface 410-*a* may allow administrators to be added or deleted. Adding an administrator may allow that person to access their relevant (e.g., assigned) communities and manage certain aspects of each residence attached to that community. In order to add a new administrator, an existing administrator indicate and add 425-*a* community staff option 425 and provide community staff information 420 about the new administrator to the community staff manager interface 410-*a*. The community staff information 420 may include the first name 420-*a*, last name 420-*b*, and email address 420-*c* of the new administrator. The new administrator may further enter a password 430 (which may undergo a confirmation process) at the community staff manager interface 410-*a*. The password 430 may be used by the new administrator to access the management interface 155 (e.g., as described with reference to FIG. 3). The confirmation process may include the community staff manager interface 410-*a* sending an email to the email address 420-*c*. The community staff manager interface 410-*a* may also allow administrators to be deleted from the property management system (thus disabling their access capabilities to the community units). Here, a different administrator (e.g., a community administrator, a property manager, a property owner) may select the delete 425-*b* community staff option 425 and enter in the community staff information 420 for the administrator to be deleted.

Figure 5:
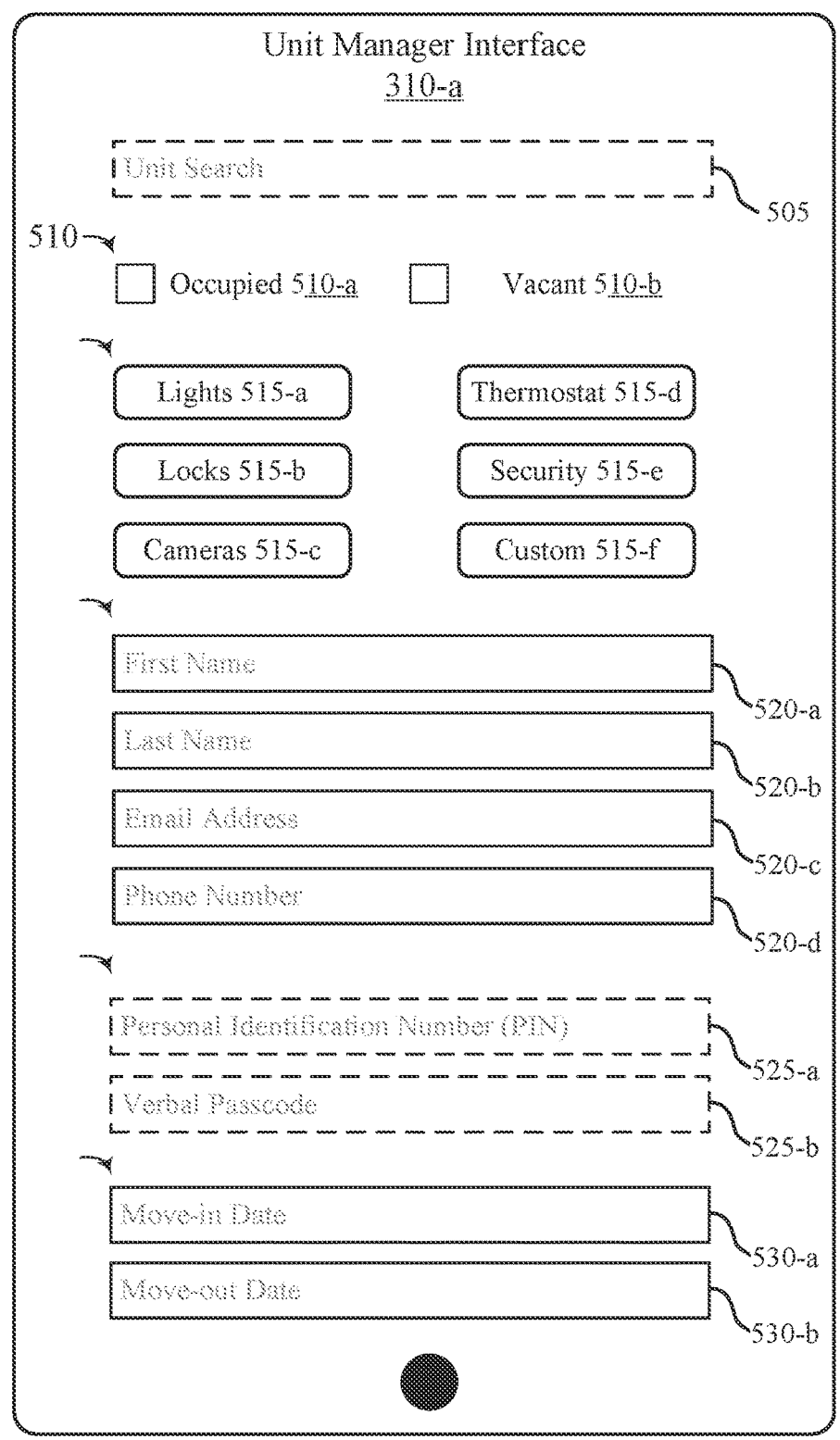
FIG. 5 illustrates an example of an interface that supports management of a smart home automation community in accordance with aspects of the present disclosure.

FIG. 5 illustrates an example of an interface 500 that supports management of a smart home automation community in accordance with aspects of the present disclosure. The interface 500 may show a unit manager interface 310-*a*. The unit manager interface 310-*a* may be an example of a display shown after an administrator selects the unit manager 310 at the management interface 155-*a* as discussed with reference to FIG. 3. In some cases, the unit manager interface 310-*a* may include a unit search 505, a status 510, devices 515, resident information 520, account information 525, and occupancy dates 530.

The unit search 505 may allow administrators to navigate through multiple communities and residences. The unit search 505 may allow the administrator to filter the residences in a variety of ways. The filters may include resident names, usernames, unit numbers, occupancy status, temperatures (i.e., residences that are high or low temperatures), or whether the residence is self-monitored. The filters may allow the administrator to enter 'wildcards' into the search filter categories.

The status 510 may indicate whether a residence is occupied 510-*a* or vacant 510-*b*. The unit manager interface 310-*a* may allow administrators to change a residence's status 510 from occupied 510-*a* to vacant 510-*b* when a resident vacates the residence. The unit manager interface 310-*a* may allow administrators to schedule move-out dates 530-*b* for residents. The unit management interface 310-*a* may also allow the move-out dates 530-*b* to be adjusted after the initial scheduling. When an administrator changes the status 510 of a residence to vacant 510-*b*, the unit manager interface 310-*a* may standardize settings for the security and/or automation system and adapt access to the residence according to the vacant 510-*b* status. For example, the unit manager interface 310-*a* may give full control of the security and/or automation system for that residence to the relevant administrators, erase the previous resident's information (i.e., verbal passcodes, PINs, camera clips, remote access, custom system rules or actions), restore default system settings (i.e. the canned rules for the security and/or automation system of the residence), restore the device names from the residence to default names, and turn off monitoring. In some cases, the unit manager interface 310-*a* may also change the device names from any new devices 515 (e.g. devices 515 that have been added during the previous resident's occupancy) to the original device name template. In this case, the unit manager interface 310-*a* may prompt the administrator to restore original names or add names to new devices 515.

The unit manager interface 310-*a* may provide an administrator a platform for controlling and/or determining information about vacant residences. In some examples, the unit manager interface 310-*a* may provide administrators with a method for controlling certain devices of vacant residences. For example, the unit manager interface 310-*a* may allow administrators to control lights 515-*a*, locks 515-*b*, cameras 515-*c*, thermostats 515-*d*, security 515-*e*, and temporary access to users (e.g., a temporary user) for a vacant residence. In some cases, the unit manager interface 310-*a* may allow an administrator to control multiple vacant residences at one time. For example, an administrator may enter one command to change the temperature of multiple vacant residences. In some cases, the unit manager interface 310-*a* may allow an administrator to establish default vacancy settings. The unit manager 310 may automatically apply these settings to any residence with a vacant 510-*b* status. In some cases, the default vacancy settings may provide a default setting for lights 515-*a*, lighting groups, locks 515-*b*, cameras 515-*c*, thermostats 515-*d*, security 515-*e*, and other custom 515-*f* rules or actions. Additionally, the vacancy usernames (e.g., the information entered into the first name 520-*a* and last name 520-*b* section of the resident information 520) may be standardized, particularly across vacant residences within the same community.

The unit manager interface 310-*a* may allow administrators to change the status 510 of a residence from vacant 510-*b* to occupied 510-*a* (e.g., when a resident or residents move in to the residence). The unit manager interface 310-*a* may have capabilities to accommodate occupant move-in. In some cases, an administrator (e.g., team member, community administrator, property manager) may utilize the unit manager interface 310-*a* at the management interface 155-*a* to register new occupants to the property management system. The administrator may use the unit manager interface 310-*a* to select the new residence (e.g., via the unit search 505) and enter the new resident's information 520. The resident's information 520 may include, for example, the resident's first name 520-*a*, last name 520-*b*, email address 520-*c*, phone number 520-*d*, resident administrator flag, a personal identification number (PIN) 525-*a* (e.g., a 4-digit PIN), a verbal passcode 525-*b*, a move-in date 530-*a*, and a date or time to schedule a message to be sent to the new resident. The unit manager 310 may use the resident's information 520 (e.g., as entered via the user management interface 310-*a*) to send an invitation message via the provided phone number 520-*d* or email address 520-*c* to download an application and account associated with the property management system. The administrator may be able to determine if and when an occupant confirms an invitation. Further, the unit manager 310 may allow administrators to grant an occupant access to a residence and certain community buildings automatically when the occupant moves in.

When an administrator changes the status 510 of a residence to occupied 510-a, the unit manager interface 310-a may standardize settings for the security and/or automation system and adapt access to the residence according to the occupied 510-a status. For example, the unit manager interface 310-a may erase data at the in-residence control panel (e.g., data at a control panel 135 as described with reference to FIG. 1), erase clips (e.g., audio and visual clips), erase activity history, restore device names based on a template created when the residence was first added to the property management system, restore the default system settings (i.e. the canned rules for the security and/or automation system of the residence), and reset any user preferences (i.e., 'SmartComfort' settings). In some examples, the unit manager interface 310-a may allow administrators to access or control certain aspects of occupied residences while preventing the administrators from accessing or controlling other aspects of the occupied residences. For example, the unit manager interface 310-a may allow administrators to control the locks 515-a and security 515-e for occupied residences. However, the unit manager interface 310-a may not allow administrators to access or control, for example, the thermostat 515-d, camera 515-c, lights 515-a, or activity feed of residences with an occupied 510-a status.

The unit manager 310 may also provide certain services to ensure that residents maintain certain privacy. For example, the administrators may not be shown as users on the in-residence control panel or application (i.e., mobile application, web application). Further, the unit manager 310 may notify a resident when an administrator accesses their residence. Additionally, the unit manager 310 may record any activity performed by an administrator in an activity history that is viewable by the residents. The unit manager 310 may, in the activity history, identify administrators by name. The unit manager 310 may further provide a property manager an activity feed noting the activity of the administrators. For example, the staff activity feed may indicate, to the property manager, when an administrator entered a residence, exited a residence, created administrators, deleted administrators, triggered an alarm, sent a message to an in-residence control panel, when a resident acknowledged a message at the resident control panel, and any control changes from an administrator. In some cases, the activity feed may further indicate the date, time, and residence for contractor appointments, when the contractor entered a residence, and when the contractor exited a residence. The unit manager 310 may retain information from the staff activity feed for an extended amount of time, for example, 6 months, or 1 year. Additionally, the unit manager 310 may allow the administrator to filter the staff activity feed. For example, the unit manager 310 may provide filters relating to the occupancy status 510, the date, the time, the residence, the resident, the administrator, or contractor.

In some examples, the unit manager 310 may utilize a microphone (e.g., at an in-residence control panel, in communication with a control panel) to detect decibel levels within the residence. The unit manager 310 may allow the administrators system to indicate this via the management interface 155-a (e.g., at a notification center viewable by administrators such as community employees and property managers), for example. The unit management interface 310-a may display a 'party event' associated with that residence. The unit manager 310 may also send a notification (e.g., a text and/or email) to the administrators in the event of excessive noise during quiet times (e.g., over 90 dB for more than 30 seconds from 10 pm to 8 am).

In some cases, the unit manager 310 may include a security configuration setting. The security configuration may determine whether the residence is self-monitored or professionally monitored. This may be a resident preference or, alternatively, may be a community-wide configuration. In some cases, the self-monitored security option may also be referred to as non-monitored security. The self-monitored residences may minimize false alarms. In some cases, the in-residence control panel may allow a resident to turn off the default alarm (e.g., piezo) and instead use the in-residence control panel speaker for alarms. In this case, the resident may also configure the speaker volume for alarms.

The unit manager 310 may provide a customer support platform. This platform may be accessible to all residents using the property management system. The property management system may determine a residents' eligibility for customer support using the verbal passcode 525-b associated with that resident.

Figure 6:
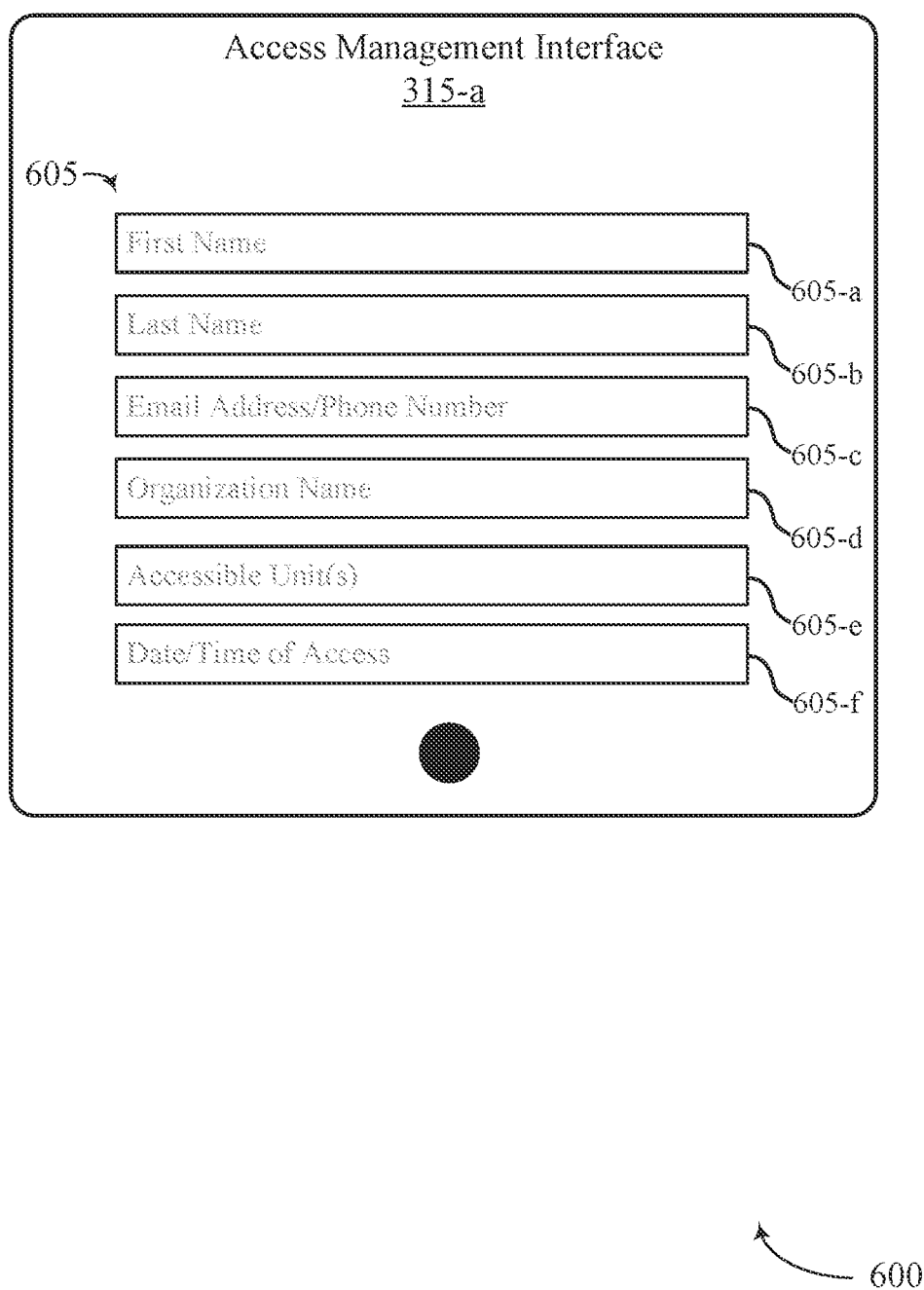
FIG. 6 illustrates an example of an interface that supports management of a smart home automation community in accordance with aspects of the present disclosure.

The unit manager 310 may provide an administrator (e.g., a property manager) with a consolidated bill for the services provided by the property management system. That is, the property management system may not send bills to individual residents. Additionally, the unit manager 310 may allow the administrator to view the status of payments made. In some cases, the unit manager 310 may allow residents to purchase property management system upgrades. Upgrades may include, for example, upgraded or additional cameras, monitored security, etc. In this case, the unit manager 310 may provide the resident with a bill directly for the upgrades FIG. 6 illustrates an example of an interface 600 that supports management of a smart home automation community in accordance with aspects of the present disclosure. The interface 600 may be an access management interface 315-a. The access management interface 315-a may be an example of a display shown after an administrator selects the access manager 315 at the management interface 155-a as discussed with reference to FIG. 3. In some cases, the access management interface 315-a may include access information 605.

The access manager 315 may provide an administrator with a platform for controlling and/or determining information related to accessing one or more residences. In some cases, an administrator may use the access management interface 315-a at the management interface 155-a to grant temporary access to one or more residences. For example, a contractor (i.e., plumber, electrician, carpet cleaner, painter) or other guest may need access to a subset of the community buildings and/or residences. The administrator may navigate to the access management interface 315-a (e.g., by selecting the access manager 315 at the management interface 155-a) to provide pertinent information to the access manager 315 regarding the temporary access. The pertinent information may include, for example, a first name 605-a, last name 605-b, email address and/or phone number 605-c, organization name 605-d (i.e., that the contractor or guest is associated with), residences being accessed 605-e, and dates and time range 605-f of the temporary access.

The access manager 315 may, in response, send a notification (i.e., a text message or email corresponding to the email address and/or phone number 605-c) to the person requiring temporary access. The notification may indicate the date and time range 605-f of the temporary access, the community address, the residence unit numbers corresponding to the accessible units 605-*e*, and instructions on how to unlock the necessary doors and disarm the security system. The access manager 315 may further notify any resident whose residence has been (or will be) accessed. The notification may include changes made to the property management system as a result. Additionally, the access manager 315 may record the actions of the person in the property management system activity history as well as the resident's activity history, which may be viewable by the resident via the in-residence control panel or the management interface 155-*a* (e.g., via a property management system application).

In some cases, the access manager 315 may provide access to residences for the administrators. However, this access may be restricted to limited times of day. Additionally, any administrator access to a residence may be reported either on the staff activity log and/or on the in-residence control panel. The access manager 315 may allow administrators to access an installer toolbox. This may allow the administrator to add additional sensor units (e.g., devices such as lights, cameras) for use within the security and/or automation system. The access manager 315 may further generate an item for the resident's activity feed to notify the resident the toolbox was unlocked as well as any changes that may have been made. In some cases, the access manager 315 may allow data entry from other systems. For example, in the event of contractor access, a system affected by the access may enter data (e.g., to the management interface 155-*a*, to the in-resident control panel).

Figure 7:
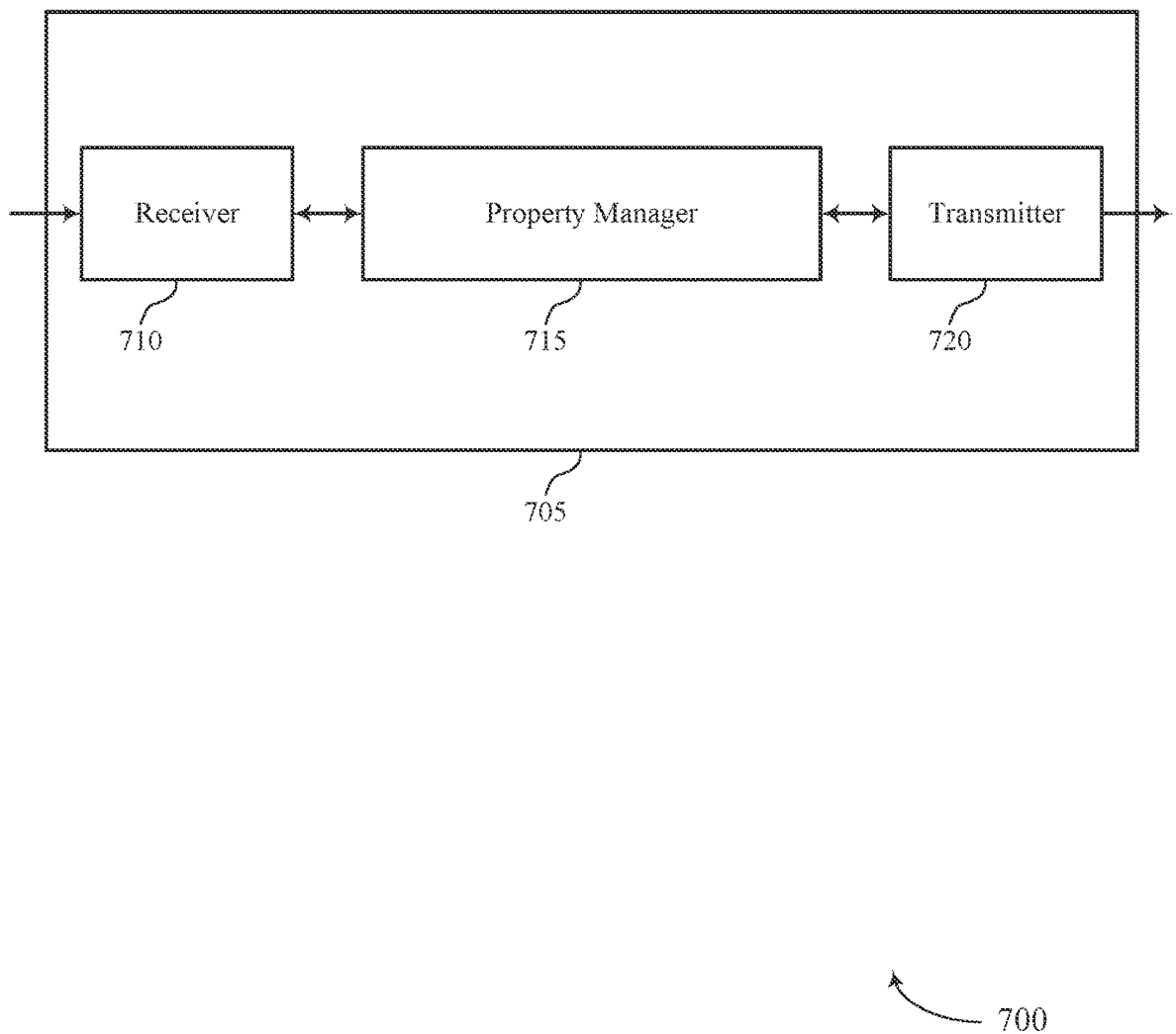
FIGS. 7 and 8 show block diagrams of devices that support management of a smart home automation community in accordance with aspects of the present disclosure.

In some cases, the access manager 315 may allow residents to grant personal guests access to their residences. In some examples, residents may have access to an interface similar to the access management interface 315-*a* (e.g., via the in-resident control panel or web-interface for the resident). Here, the residents may fill out the access information 605 for the prospective guest. For example, the resident may enter the guest's first name 605-*a*, last name 605-*b*, email address and/or phone number 605-*c*, and the date and/or time range 605-*f* of thee access. Here, the guests may be granted access to the resident's residence but not perimeter access to the community. In some cases, the access manager 315 may enable a resident to distribute virtual keys to other people. For example, a resident may give a virtual key to a dog walker, cleaning staff, friends, or family. The virtual key may have specific times and dates that the virtual key allows the person to access the residence FIG. 7 shows a block diagram 700 of a device 705 that supports management of a smart home automation community in accordance with aspects of the present disclosure. The device 705 may be an example of aspects of a device as described herein. The device 705 may include a receiver 710, a property manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to management of a smart home automation community, etc.). Information may be passed on to other components of the device 705. The receiver 710 may be an example of aspects of the transceiver 1020 described with reference to FIG. 10. The receiver 710 may utilize a single antenna or a set of antennas.

The property manager 715 may transmit a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the device 705, retrieve the information from the control panel of the property based on an authentication of the credentials, where the authentication of the credentials includes receiving, from a device of an occupant of the property, an acknowledgement message to the request, and generate an account associated with the control panel of the property based on the information, where the account grants a level of access to the property management personnel. The property manager 715 may be an example of aspects of the property manager 1010 described herein.

The property manager 715, or its sub-components, may be implemented in hardware, code (e.g., software or firmware) executed by a processor, or any combination thereof. If implemented in code executed by a processor, the functions of the property manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The property manager 715, or its sub-components, may be physically located at various positions, including being distributed such that portions of functions are implemented at different physical locations by one or more physical components. In some examples, the property manager 715, or its sub-components, may be a separate and distinct component in accordance with various aspects of the present disclosure. In some examples, the property manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
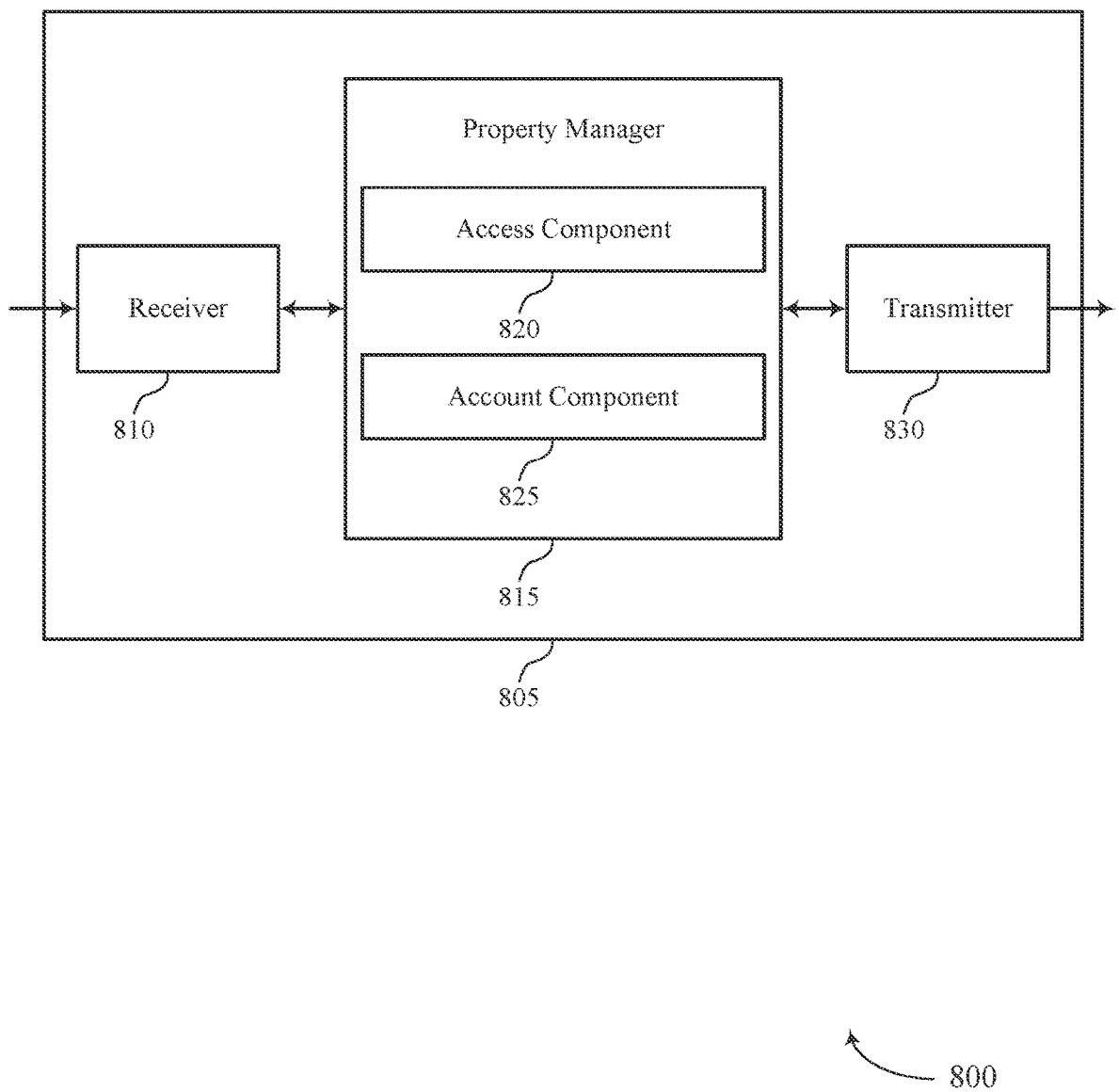

FIG. 8 shows a block diagram 800 of a device 805 that supports management of a smart home automation community in accordance with aspects of the present disclosure. The device 805 may be an example of aspects of a device 705 or a device 115 as described herein. The device 805 may include a receiver 810, a property manager 815, and a transmitter 830. The device 805 may also include a processor. Each of these components may be in communication with one another (e.g., via one or more buses).

The receiver 810 may receive information such as packets, user data, or control information associated with various information channels (e.g., control channels, data channels, and information related to management of a smart home automation community, etc.). Information may be passed on to other components of the device 805. The receiver 810 may be an example of aspects of the transceiver 1020 described with reference to FIG. 10. The receiver 810 may utilize a single antenna or a set of antennas.

The property manager 815 may be an example of aspects of the property manager 715 as described herein. The property manager 815 may include an access component 820 and an account component 825. The property manager 815 may be an example of aspects of the property manager 1010 described herein.

The access component 820 may transmit a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the device 805 and retrieve the information from the control panel of the property based on an authentication of the credentials, where the authentication of the credentials includes receiving, from a device of an occupant of the property, an acknowledgement message to the request. The account component 825 may generate an account associated with the control panel of the property based on the information, where the account grants a level of access to the property management personnel.

The transmitter 830 may transmit signals generated by other components of the device 805. In some examples, the transmitter 830 may be collocated with a receiver 810 in a transceiver module. For example, the transmitter 830 may be an example of aspects of the transceiver 1020 described with reference to FIG. 10. The transmitter 830 may utilize a single antenna or a set of antennas.

Figure 9:
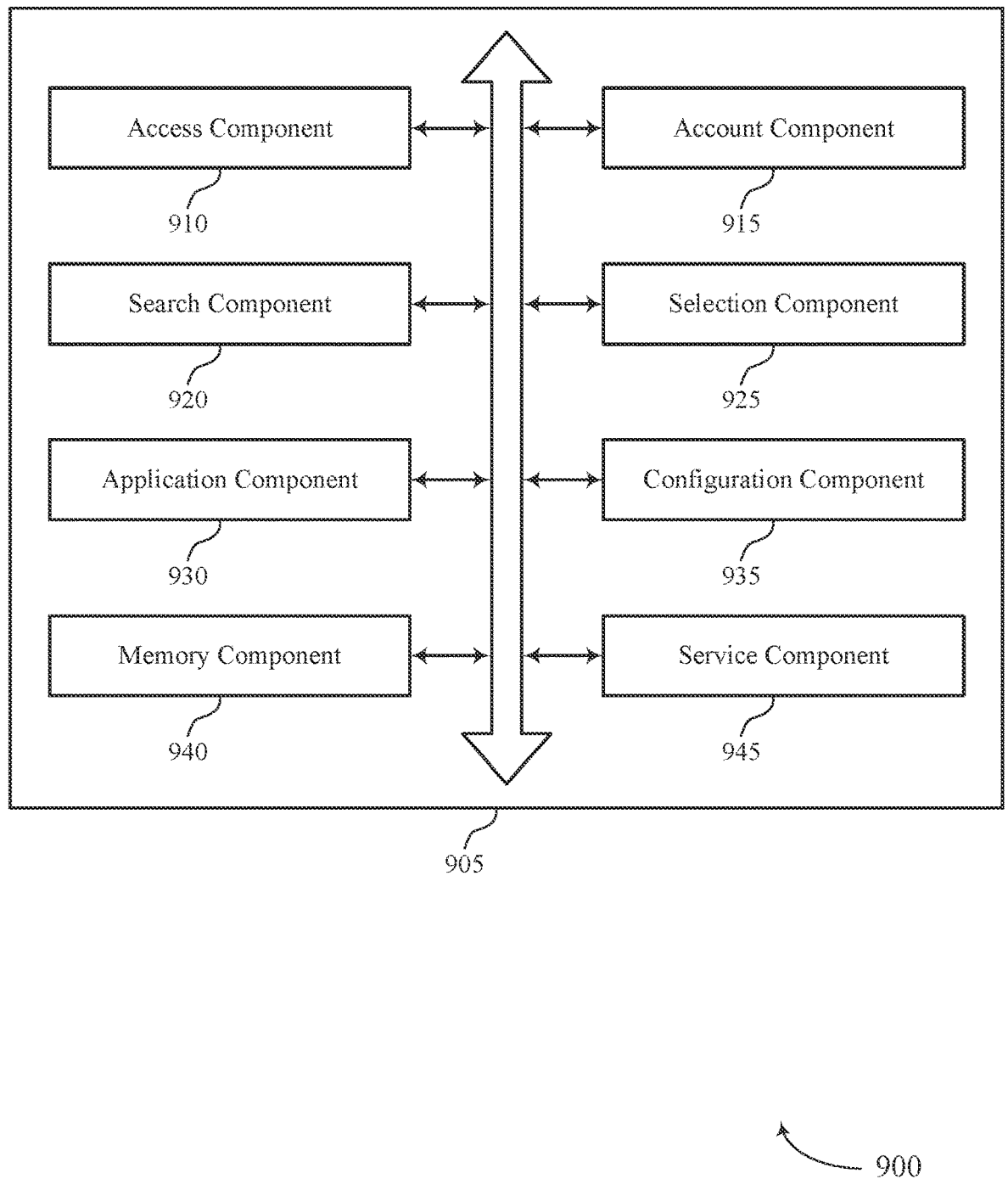
FIG. 9 shows a block diagram of a property manager that supports management of a smart home automation community in accordance with aspects of the present disclosure.

FIG. 9 shows a block diagram 900 of a property manager 905 that supports management of a smart home automation community in accordance with aspects of the present disclosure. The property manager 905 may be an example of aspects of a property manager 715, a property manager 815, or a property manager 1010 described herein. The property manager 905 may include an access component 910, an account component 915, a search component 920, a selection component 925, an application component 930, a configuration component 935, a memory component 940, and a service component 945. Each of these modules may communicate, directly or indirectly, with one another (e.g., via one or more buses).

The access component 910 may transmit a request to access information from a control panel of a property associated with a smart home automation community. The request including credentials specific to a property management personnel associated with the smart home automation community. The smart home automation community may include a number of properties within a geographic coverage (e.g., an area, a subarea of an area) of each other, and each having at least one control panel in communication with the computing device (e.g., that supports property manager 905). In some examples, the access component 910 may retrieve the information from the control panel of the property based on an authentication of the credentials, where the authentication of the credentials includes receiving, from a device of an occupant of the property, an acknowledgement message to the request. In some examples, the access component 910 may grant an administrative management personnel access to an account, the access being less than or equal to the level of access granted to the property management personnel, where the level of access is further based on the granting. In some examples, the access component 910 may generate a temporary access code for the occupant to access the property based on an indication of a selected vacant property. The temporary access code may be valid for a temporal period and may trigger the computing device (e.g., that supports property manager 905) to transmit a survey to the device of the occupant based on a usage of the temporary access code. In some examples, the access component 910 may transmit, to the device of the occupant, the temporary access code.

The account component 915 may generate the account associated with the control panel of the property based on the information, where the account grants a level of access to the property management personnel. In some cases, the level of access includes assigning a capability for the property management personnel to unlock or lock one or more barriers associated with the property based on an emergency occasion. In some cases, the level of access includes assigning a restriction on the account for the property management personnel, the restriction being an inability for the property management personnel to access the control panel or one or more home automation components associated with the property.

In some examples, the account component 915 may remove previous information from the control panel based on generating the account associated with the control panel of the property, the previous information being associated with a previous occupant of the property. In some examples, the account component 915 may add the control panel of the property to the smart home automation community based on the retrieving, where generating the account associated with the control panel of the property is further based on adding the control panel of the property to the smart home automation community. In some examples, the account component 915 may upload a report to the account, where the report is viewable to the occupant and the property management personnel.

The search component 920 may receive a request for a property search including a set of parameters, where the set of parameters includes a property type, a habitable square-footage associated with the property search, a neighborhood type associated with the property search, or a combination thereof. In some examples, the search component 920 may identify a set of vacant properties based on the request, where the quantity of vacant properties are associated with the smart home automation community and satisfy at least one parameter from the set of parameters.

The selection component 925 may select a vacant property from the set of vacant properties, where the vacant property includes the property associated with the smart home automation community. In some examples, the selection component 925 may transmit, to the device of the occupant, a message including a selectable option to select the vacant property from the set of vacant properties, where selecting the vacant property from the set of properties include receiving, from the device of the occupant, a message including an indication of the selected vacant property from the set of vacant properties.

The application component 930 may transmit, to the device of the occupant, a message including instructions to download an application associated with the smart home automation community, where the account is accessible via the application, the message including a short message service (SMS) message including a universal resource locator (URL) directing the device to an interface to download the application.

The configuration component 935 may configure the control panel to a default state based on the removing. In some examples, the configuration component 935 may configure one or more home automation components to a default state based on configuring the control panel to the default state, where the one or more home automation components includes a stand-alone camera, a smart thermostat, a smart appliance, a smart lighting system, or a heating ventilation air control (HVAC) system, or a combination thereof, where the previous information includes a setting history associated with the one or more home automation components. In some examples, the configuration component 935 may configure a set of parameters associated with the account of the property based on the information, where configuring the account grants the level of access to the property management personnel. In some examples, the configuration component 935 may configure the control panel to periodically or aperiodically receive or retrieve activity from one or more home automation components associated with the property. In some examples, configuration component 935 may configure the control panel to generate the report based on the activity, the activity including a sensor activation or deactivation from one or more home automation components, a battery status associated with the one or more home automation components, where the reporting further includes occurrences of service personnel visiting the property, occurrences of the property management personnel accessing or altering a feature on the account, or both. In some examples, the configuration component 935 may configure the control panel to transmit a notification message to the device of the occupant or display the notification message at the control panel, where the notification message includes an indication of the service performed, an entry time of the service personnel to the property, or an exit time of the service personnel out of the property, or a combination thereof.

The memory component 940 may store the information of the property in a relational database associated with the smart home automation community. The service component 945 may receive, from the control panel or the device of the occupant, a service request. In some examples, the service component 945 may identify a schedule associated with the occupant based on the service request, where the service request provides an indication to plan a service with or without the occupant being present at the property. In some examples, the service component 945 may automatically schedule a service personnel to visit the property and perform the service based on the service request and the schedule associated with the occupant. In some examples, service component 945 may transmit, to a device of the service personnel, a message indicating the service request, where the message includes at least one of payment information, geolocation information of the property, access information of the property, contact information of the occupant or the management personnel, or any combination thereof. In some examples, service component 945 may transmit, to a device of the service personnel, access information to the property at a temporal period associated with the scheduled service, where the access information includes a digital identification number associated with a digital lock of a barrier to the property.

Figure 10:
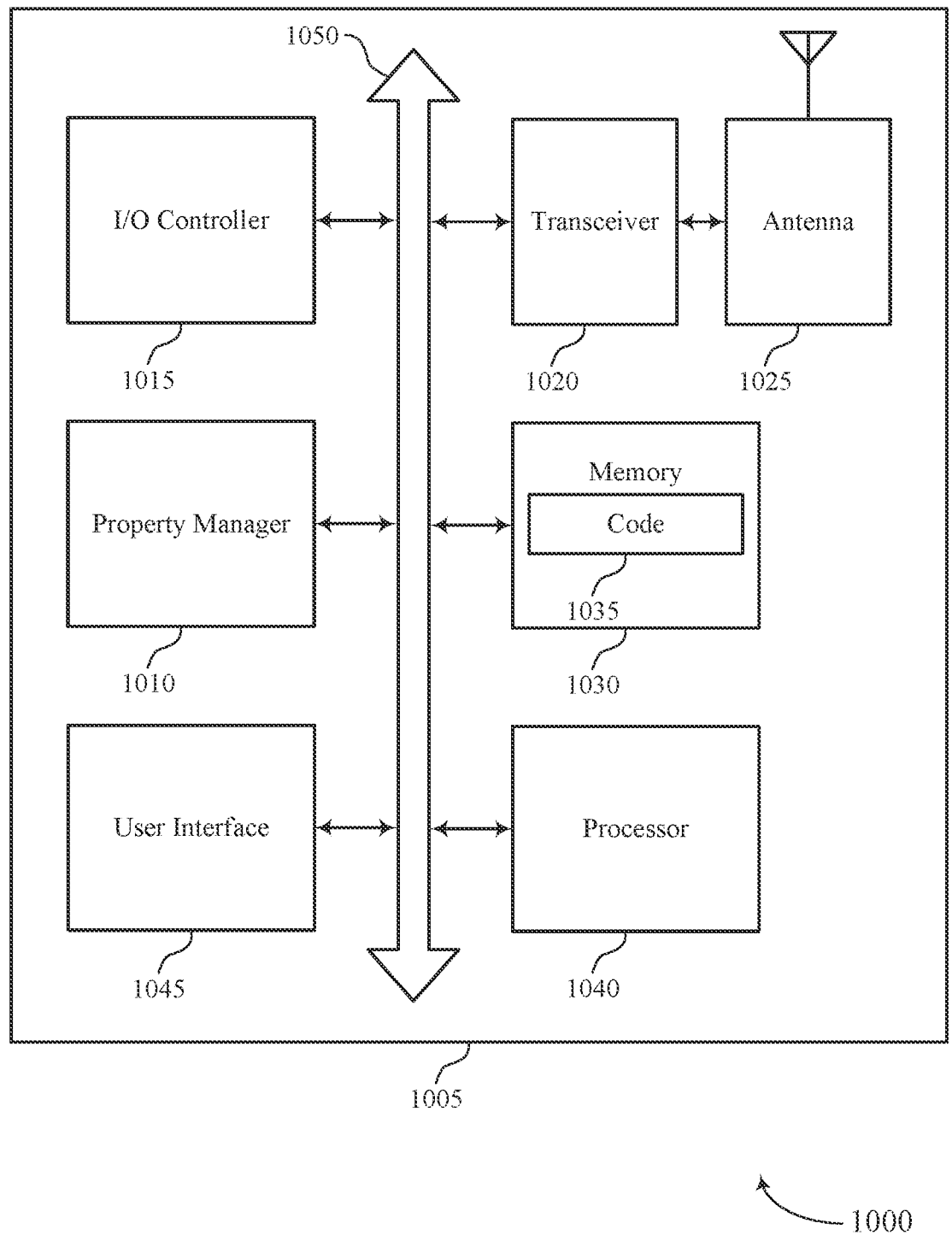
FIG. 10 shows a diagram of a system including a device that supports management of a smart home automation community in accordance with aspects of the present disclosure.

FIG. 10 shows a diagram of a system 1000 including a device 1005 that supports management of a smart home automation community in accordance with aspects of the present disclosure. The device 1005 may be an example of or include the components of device 705, device 805, or a device as described herein. The device 1005 may include components for bi-directional voice and data communications including components for transmitting and receiving communications, including a property manager 1010, an I/O controller 1015, a transceiver 1020, an antenna 1025, memory 1030, a processor 1040, and a user-interface 1045. These components may be in electronic communication via one or more buses (e.g., bus 1050).

The property manager 1010 may transmit a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the device 1005, retrieve the information from the control panel of the property based on an authentication of the credentials, where the authentication of the credentials includes receiving, from a device of an occupant of the property, an acknowledgement message to the request, and generate an account associated with the control panel of the property based on the information, where the account grants a level of access to the property management personnel.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the device 1005 may include a single antenna 1025. However, in some cases the device 1005 may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The code 1035 may include instructions to implement aspects of the present disclosure, including instructions to support property manager. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting management of a smart home automation community).

The user-interface 1045 may include instructions to implement aspects of the present disclosure, including instructions to support property manager. The user-interface 1045 may include, but is not limited to a resistance touch-based interface, a capacitance touch-based interface, a surface acoustic wave-based interface, an optical touch-based interface, an electromagnetic guidance-based interface, among others. For example, user-interface 1045 may represent a liquid-crystal display (LCD), a LED display, an organic LED (OLED), an active-matrix OLED (AMOLED), or the like. In some cases, user-interface 1045 and I/O controller 1015 may be or represent aspects of a same component (e.g., a touchscreen) of device 1005.

Figure 11:
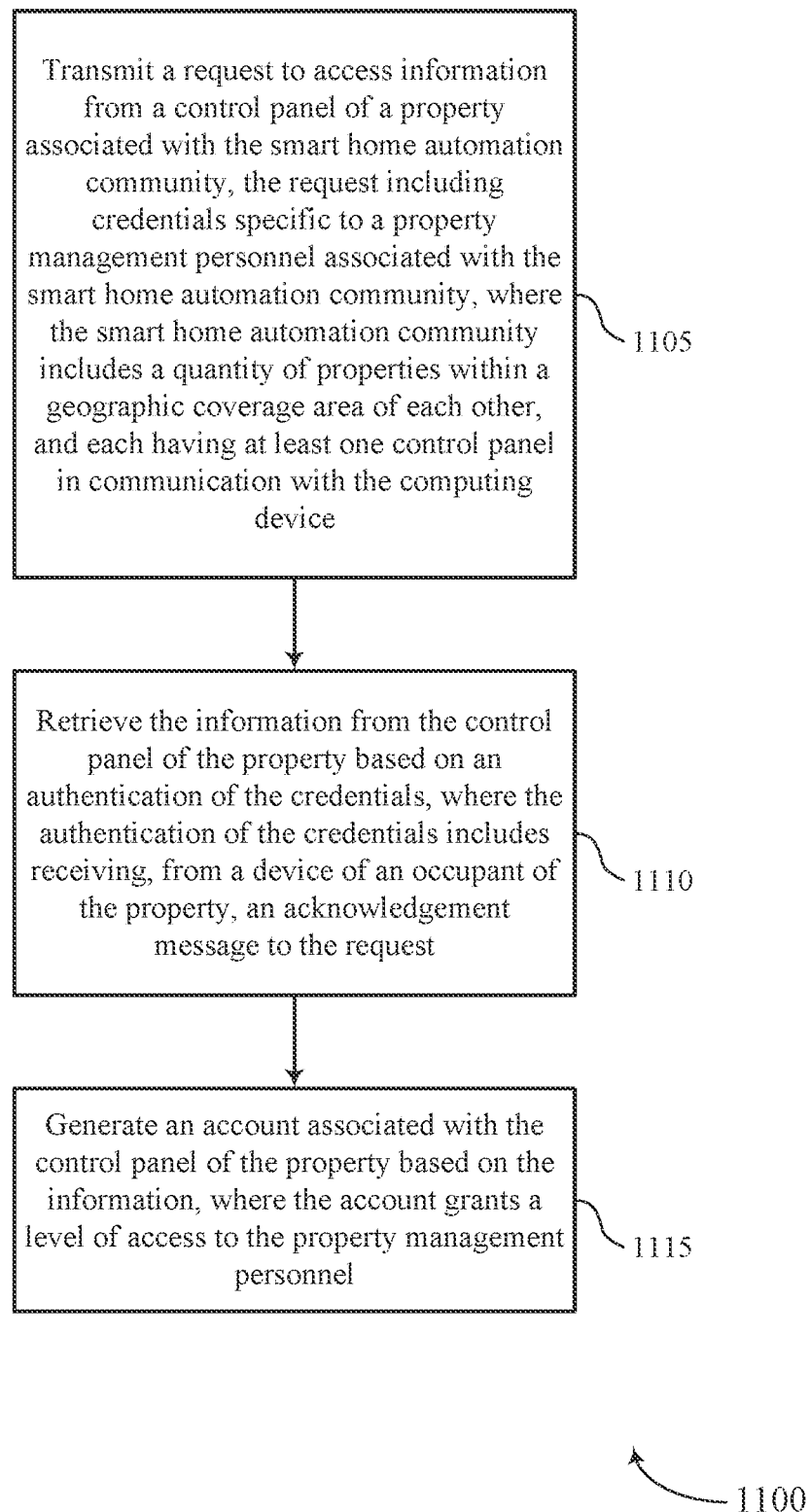
FIGS. 11 through 13 show flowcharts illustrating methods that support management of a smart home automation community in accordance with aspects of the present disclosure.

FIG. 11 shows a flowchart illustrating a method 1100 that supports management of a smart home automation community in accordance with aspects of the present disclosure. The operations of method 1100 may be implemented by a device or its components as described herein. For example, the operations of method 1100 may be performed by a property manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1105, the device may transmit a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the computing device. The operations of 1105 may be performed according to the methods described herein. In some examples, aspects of the operations of 1105 may be performed by an access component as described with reference to FIGS. 7 through 10.

At 1110, the device may retrieve the information from the control panel of the property based on an authentication of the credentials, where the authentication of the credentials includes receiving, from a device of an occupant of the property, an acknowledgement message to the request. The operations of 1110 may be performed according to the methods described herein. In some examples, aspects of the operations of 1110 may be performed by an access component as described with reference to FIGS. 7 through 10.

At 1115, the device may generate an account associated with the control panel of the property based on the information, where the account grants a level of access to the property management personnel. The operations of 1115 may be performed according to the methods described herein. In some examples, aspects of the operations of 1115 may be performed by an account component as described with reference to FIGS. 7 through 10.

Figure 12:
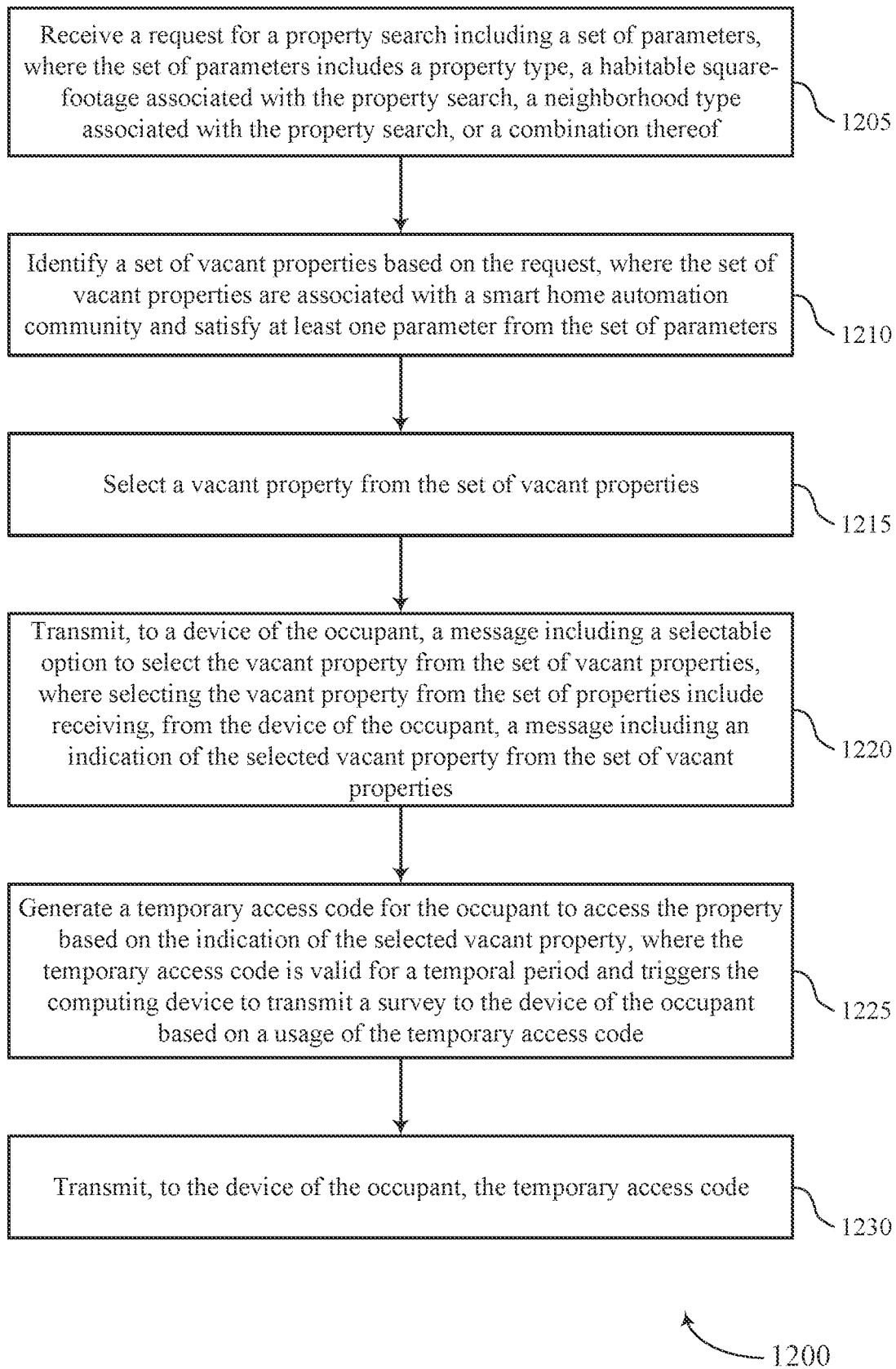

FIG. 12 shows a flowchart illustrating a method 1200 that supports management of a smart home automation community in accordance with aspects of the present disclosure. The operations of method 1200 may be implemented by a device or its components as described herein. For example, the operations of method 1200 may be performed by a property manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1205, the device may receive a request for a property search including a set of parameters, where the set of parameters includes a property type, a habitable square-footage associated with the property search, a neighborhood type associated with the property search, or a combination thereof. The operations of 1205 may be performed according to the methods described herein. In some examples, aspects of the operations of 1205 may be performed by a search component as described with reference to FIGS. 7 through 10.

At 1210, the device may identify a set of vacant properties based on the request, where the set of vacant properties are associated with a smart home automation community and satisfy at least one parameter from the set of parameters. The operations of 1210 may be performed according to the methods described herein. In some examples, aspects of the operations of 1210 may be performed by a search component as described with reference to FIGS. 7 through 10.

At 1215, the device may select a vacant property from the set of vacant properties. The operations of 1215 may be performed according to the methods described herein. In some examples, aspects of the operations of 1215 may be performed by a selection component as described with reference to FIGS. 7 through 10.

At 1220, the device may transmit, to a device of the occupant, a message including a selectable option to select the vacant property from the set of vacant properties, where selecting the vacant property from the set of properties include receiving, from the device of the occupant, a message including an indication of the selected vacant property from the set of vacant properties. The operations of 1220 may be performed according to the methods described herein. In some examples, aspects of the operations of 1220 may be performed by a selection component as described with reference to FIGS. 7 through 10.

At 1225, the device may generate a temporary access code for the occupant to access the property based on the indication of the selected vacant property, where the temporary access code is valid for a temporal period and triggers the computing device to transmit a survey to the device of the occupant based on a usage of the temporary access code. The operations of 1225 may be performed according to the methods described herein. In some examples, aspects of the operations of 1225 may be performed by an access component as described with reference to FIGS. 7 through 10.

At 1230, the device may transmit, to the device of the occupant, the temporary access code. The operations of 1230 may be performed according to the methods described herein. In some examples, aspects of the operations of 1230 may be performed by an access component as described with reference to FIGS. 7 through 10.

Figure 13:
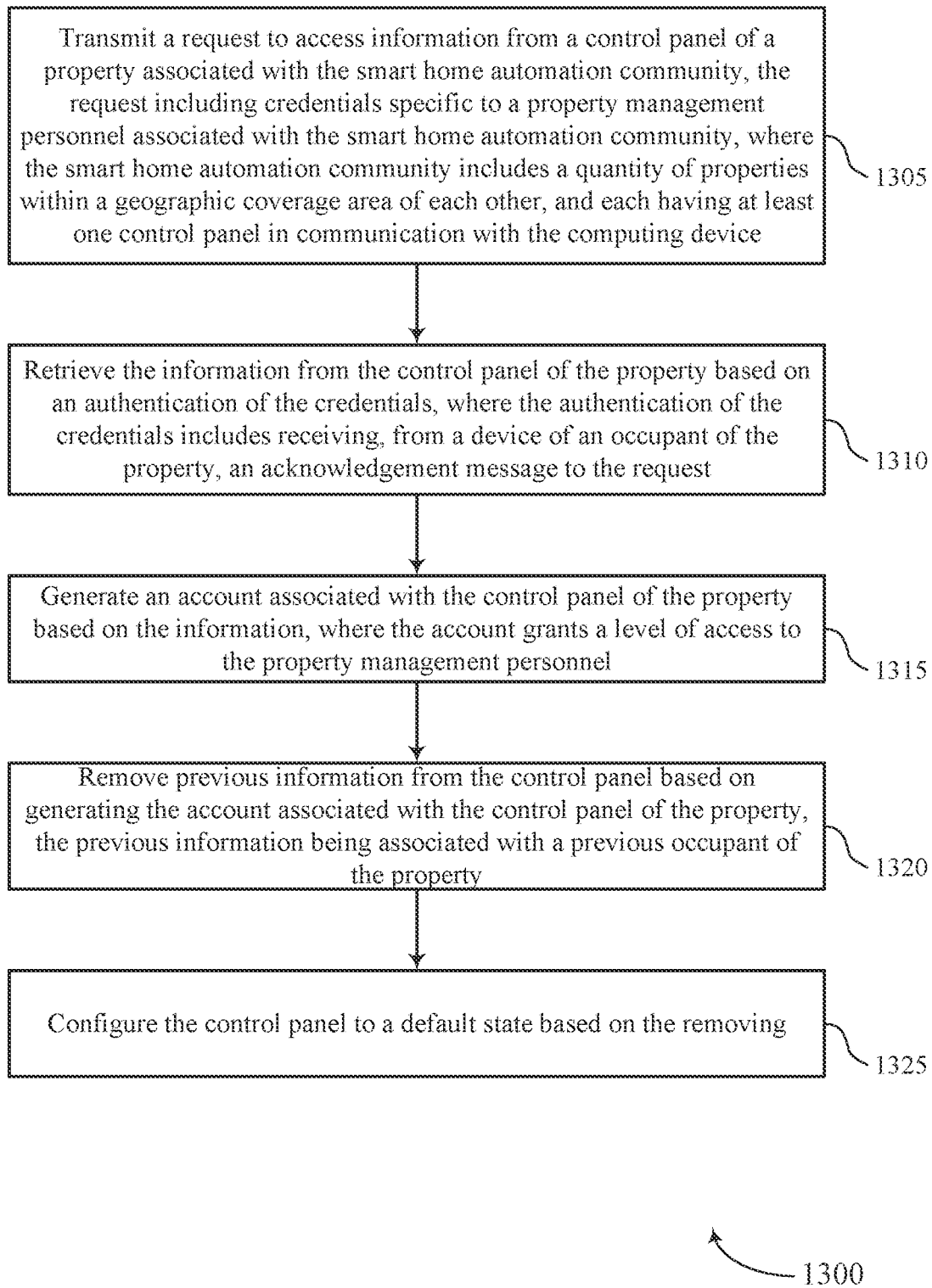

FIG. 13 shows a flowchart illustrating a method 1300 that supports management of a smart home automation community in accordance with aspects of the present disclosure. The operations of method 1300 may be implemented by a device or its components as described herein. For example, the operations of method 1300 may be performed by a property manager as described with reference to FIGS. 7 through 10. In some examples, a device may execute a set of instructions to control the functional elements of the device to perform the functions described below. Additionally or alternatively, a device may perform aspects of the functions described below using special-purpose hardware.

At 1305, the device may transmit a request to access information from a control panel of a property associated with the smart home automation community, the request including credentials specific to a property management personnel associated with the smart home automation community, where the smart home automation community includes a quantity of properties within a geographic coverage area of each other, and each having at least one control panel in communication with the computing device. The operations of 1305 may be performed according to the methods described herein. In some examples, aspects of the operations of 1305 may be performed by an access component as described with reference to FIGS. 7 through 10.

At 1310, the device may retrieve the information from the control panel of the property based on an authentication of the credentials, where the authentication of the credentials includes receiving, from a device of an occupant of the property, an acknowledgement message to the request. The operations of 1310 may be performed according to the methods described herein. In some examples, aspects of the operations of 1310 may be performed by an access component as described with reference to FIGS. 7 through 10.

At 1315, the device may generate an account associated with the control panel of the property based on the information, where the account grants a level of access to the property management personnel. The operations of 1315 may be performed according to the methods described herein. In some examples, aspects of the operations of 1315 may be performed by an account component as described with reference to FIGS. 7 through 10.

At 1320, the device may remove previous information from the control panel based on generating the account associated with the control panel of the property, the previous information being associated with a previous occupant of the property. The operations of 1320 may be performed according to the methods described herein. In some examples, aspects of the operations of 1320 may be performed by an account component as described with reference to FIGS. 7 through 10.

At 1325, the device may configure the control panel to a default state based on the removing. The operations of 1325 may be performed according to the methods described herein. In some examples, aspects of the operations of 1325 may be performed by a configuration component as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some cases, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various cases have been described and/or illustrated here in the context of fully functional computing systems, one or more of these exemplary cases may be distributed as a program product in a variety of forms, regardless of the particular type of computer-readable media used to actually carry out the distribution. The cases disclosed herein may also be implemented using software modules that perform certain tasks. These software modules may include script, batch, or other executable files that may be stored on a computer-readable storage medium or in a computing system. In some cases, these software modules may permit and/or instruct a computing system to perform one or more of the exemplary cases disclosed here.

This description, for purposes of explanation, has been described with reference to specific cases. The illustrative discussions above, however, are not intended to be exhaustive or limit the present systems and methods to the precise forms discussed. Many modifications and variations are possible in view of the above teachings. The cases were chosen and described in order to explain the principles of the present systems and methods and their practical applications, to enable others skilled in the art to utilize the present systems, apparatus, and methods and various cases with various modifications as may be suited to the particular use contemplated.

What is claimed is:

1. A method for a smart home automation community, the method being performed by a computing device comprising at least one processor, the method comprising:
   receiving a request for a property search of the smart home automation community, the request comprising a set of search parameters;
   identifying a vacant property of the smart home automation community based at least in part on the request, the vacant property satisfying at least one search parameter of the set of search parameters;
   transmitting a request to access information from a control panel of the vacant property associated with the smart home automation community, the request comprising credentials specific to a property management personnel associated with the smart home automation community, wherein:
      the smart home automation community comprises a plurality of properties within a geographic coverage area of each other, and each having at least one control panel in communication with the computing device; and
      the credentials specific to the property management personnel provide access to a control panel of multiple of the plurality of properties of the smart home automation community;
   retrieving the information from the control panel of the vacant property based at least in part on an authentication of the credentials, wherein the authentication of the credentials comprises receiving, from a device of an occupant of the vacant property, an acknowledgement message to the request;
   generating an account associated with the control panel of the vacant property based at least in part on the information, wherein the account grants a level of access to the property management personnel; and
   generating a temporary access code for access to the vacant property.

2. The method of claim 1,
   wherein the set of parameters comprises a property type, a habitable square-footage associated with the property search, a neighborhood type associated with the property search, or a combination thereof.

3. The method of claim 1, further comprising:
   transmitting, to the device of the occupant, a message comprising a selectable option to select the vacant property from a set of vacant properties, wherein selecting the vacant property from the set of properties comprise receiving, from the device of the occupant, a message comprising an indication of the selected vacant property from the set of vacant properties.

4. The method of claim 3, wherein the temporary access code is valid for a temporal period and triggers the computing device to transmit a survey to the device of the occupant based at least in part on a usage of the temporary access code.

5. The method of claim 1, further comprising:
transmitting, to the device of the occupant, a message comprising instructions to download an application associated with the smart home automation community, wherein the account is accessible via the application, the message comprising a short message service (SMS) message comprising a universal resource locator (URL) directing the device to an interface to download the application.

6. The method of claim 1, further comprising:
removing previous information from the control panel based at least in part on generating the account associated with the control panel of the vacant property, the previous information being associated with a previous occupant of the vacant property; and
configuring the control panel to a default state based at least in part on the removing.

7. The method of claim 6, further comprising:
configuring one or more home automation components to a default state based at least in part on configuring the control panel to the default state, wherein the one or more home automation components comprises a stand-alone camera, a smart thermostat, a smart appliance, a smart lighting system, or a heating ventilation air control (HVAC) system, or a combination thereof, wherein the previous information comprises a setting history associated with the one or more home automation components.

8. The method of claim 1, further comprising:
adding the control panel of the vacant property to the smart home automation community based at least in part on the retrieving, wherein generating the account associated with the control panel of the vacant property is further based at least in part on adding the control panel of the vacant property to the smart home automation community.

9. The method of claim 1, further comprising:
configuring a set of parameters associated with the account of the vacant property based at least in part on the information, wherein configuring the account grants the level of access to the property management personnel; and
storing the information of the vacant property in a relational database associated with the smart home automation community.

10. The method of claim 9, wherein:
the level of access comprises assigning a capability for the property management personnel to unlock or lock one or more barriers associated with the vacant property based at least in part on an emergency occasion; and
the level of access comprises assigning a restriction on the account for the property management personnel, the restriction being an inability for the property management personnel to access the control panel or one or more home automation components associated with the vacant property.

11. The method of claim 9, wherein configuring the set of parameters further comprises:

configuring the control panel to periodically or periodically receive or retrieve activity from one or more home automation components associated with the vacant property;
configuring the control panel to generate a report based at least in part on the activity, the activity comprising a sensor activation or deactivation from one or more home automation components, a battery status associated with the one or more home automation components, wherein the reporting further comprises occurrences of service personnel visiting the vacant property, occurrences of the property management personnel accessing or altering a feature on the account, or both; and
uploading the report to the account, wherein the report is viewable to the occupant and the property management personnel.

12. The method of claim 1, further comprising:
granting an administrative management personnel access to the account, the access being less than or equal to the level of access granted to the property management personnel, wherein the level of access is further based at least in part on the granting.

13. The method of claim 1, further comprising:
receiving, from the control panel or the device of the occupant, a service request;
identifying a schedule associated with the occupant based at least in part on the service request, wherein the service request provides an indication to plan a service with or without the occupant being present at the vacant property; and
automatically scheduling a service personnel to visit the vacant property and perform the service based at least in part on the service request and the schedule associated with the occupant.

14. The method of claim 13, further comprising:
transmitting, to a device of the service personnel, a message indicating the service request, wherein the message comprises at least one of payment information, geolocation information of the vacant property, access information of the vacant property, contact information of the occupant or the management personnel, or any combination thereof.

15. The method of claim 13, further comprising:
transmitting, to a device of the service personnel, access information to the vacant property at a temporal period associated with the scheduled service, wherein the access information comprises a digital identification number associated with a digital lock of a barrier to the vacant property.

16. The method of claim 13, further comprising:
configuring the control panel to transmit a notification message to the device of the occupant or display the notification message at the control panel, wherein the notification message comprises an indication of the service performed, an entry time of the service personnel to the vacant property, or an exit time of the service personnel out of the vacant property, or a combination thereof.

17. The method of claim 1, wherein the control panel is associated with a subscription service provider.

18. An apparatus for a smart home automation community, the method:
a processor, memory in electronic communication with the processor; and
instructions stored in the memory and executable by the processor to cause the apparatus to:

receive a request for a property search of the smart home automation community, the request comprising a set of search parameters;

identify a vacant property of the smart home automation community based at least in part on the request, the vacant property satisfying at least one search parameter of the set of search parameters;

transmit a request to access information from a control panel of the vacant property associated with the smart home automation community, the request comprising credentials specific to a property management personnel associated with the smart home automation community, wherein:

the smart home automation community comprises a plurality of properties within a geographic coverage area of each other, and each having at least one control panel in communication with the computing device; and the credentials specific to the property management personnel provide access to a control panel of multiple of the plurality of properties of the smart home automation community;

retrieve the information from the control panel of the vacant property based at least in part on an authentication of the credentials, wherein the authentication of the credentials comprises receiving, from a device of an occupant of the vacant property, an acknowledgement message to the request;

generate an account associated with the control panel of the vacant property based at least in part on the information, wherein the account grants a level of access to the property management personnel; and generate a temporary access code for access to the vacant property.

19. The apparatus of claim 18, wherein the set of parameters comprises a property type, a habitable square-footage associated with the property search, a neighborhood type associated with the property search, or a combination thereof.

20. A non-transitory computer-readable medium storing code for a smart home automation community, the method being performed by a computing device comprising at least one processor, the method comprising, the code comprising instructions executable by a processor to:

receive a request for a property search of the smart home automation community, the request comprising a set of search parameters;

identify a vacant property of the smart home automation community based at least in part on the request, the vacant property satisfying at least one search parameter of the set of search parameters;

transmit a request to access information from a control panel of the vacant property associated with the smart home automation community, the request comprising credentials specific to a property management personnel associated with the smart home automation community, wherein:

the smart home automation community comprises a plurality of properties within a geographic coverage area of each other, and each having at least one control panel in communication with the computing device; and the credentials specific to the property management personnel provide access to a control panel of each of multiple of the plurality of properties of the smart home automation community;

retrieve the information from the control panel of the vacant property based at least in part on an authentication of the credentials, wherein the authentication of the credentials comprises receiving, from a device of an occupant of the vacant property, an acknowledgement message to the request;

generate an account associated with the control panel of the vacant property based at least in part on the information, wherein the account grants a level of access to the property management personnel; and generate a temporary access code for access to the vacant property.

* * * * *